United States Patent
Watzek et al.

(10) Patent No.: US 10,047,812 B2
(45) Date of Patent: Aug. 14, 2018

(54) ACTUATOR FOR ELECTRIC PARK BRAKE SYSTEM AND SELF-LOCKING MECHANISM THEREOF

(71) Applicant: Johnson Electric S.A., Murten (CH)

(72) Inventors: Michael Watzek, Courgevaux (CH); Yuan Chun Zhang, Shenzhen (CN); Jin An Nie, Shenzhen (CN); Fa Yun Qi, Shenzhen (CN); Ya Jie Chen, Shenzhen (CN); Rui Feng Qin, Hong Kong (CN); Michael Kaeser, Dudingen (CH)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 15/010,991

(22) Filed: Jan. 29, 2016

(65) Prior Publication Data
US 2016/0223040 A1 Aug. 4, 2016

(30) Foreign Application Priority Data
Jan. 30, 2015 (CN) .......................... 2015 1 0050697

(51) Int. Cl.
| | |
|---|---|
| *B60L 7/00* | (2006.01) |
| *F16D 65/18* | (2006.01) |
| *F16D 65/50* | (2006.01) |
| *F16D 121/24* | (2012.01) |
| *F16D 125/48* | (2012.01) |
| *F16D 127/06* | (2012.01) |

(52) U.S. Cl.
CPC ............. *F16D 65/18* (2013.01); *F16D 65/50* (2013.01); *F16D 2121/24* (2013.01); *F16D 2125/48* (2013.01); *F16D 2127/06* (2013.01)

(58) Field of Classification Search
CPC .......... F16D 65/18; F16D 65/14; F16D 41/04; F16D 2121/24; F16D 2125/40; F16D 2127/06; F16D 2125/48; B60T 13/746
USPC ..... 188/162, 156, 157, 265; 192/46; 310/92, 310/93, 77
See application file for complete search history.

(56) References Cited

U.S. PATENT DOCUMENTS

| | | | | |
|---|---|---|---|---|
| 4,499,787 A * | 2/1985 | Leistner | ................. | G05G 11/00 192/48.91 |
| 4,953,669 A * | 9/1990 | Severinsson | ............ | B60T 13/04 188/158 |
| 7,880,351 B2 * | 2/2011 | Strueber | ................. | F16D 41/10 310/77 |
| 9,182,021 B2 * | 11/2015 | Muramatsu | ........... | F16D 55/226 |
| 2010/0163351 A1 * | 7/2010 | Sakashita | ................ | B60T 7/107 188/182 |

(Continued)

FOREIGN PATENT DOCUMENTS

| | | |
|---|---|---|
| DE | 102011085851 A1 | 5/2012 |
| DE | 102012208294 A1 | 11/2012 |

*Primary Examiner* — Pamela Rodriguez
(74) *Attorney, Agent, or Firm* — Muncy, Geissler, Olds & Lowe, P.C.

(57) ABSTRACT

An actuator for an electric parking brake system includes a motor, an output member, and a speed reduction device. The speed reduction device includes a transmission mechanism and a self-locking mechanism. The self-locking mechanism includes a fixed member, first and second rotating bodies, and a spring. The second rotating body transmits torque to the output member via a planetary gear mechanism. The spring prevents the brake from driving the motor.

19 Claims, 20 Drawing Sheets

(56) References Cited

U.S. PATENT DOCUMENTS

2014/0166413 A1\* 6/2014 Giering ................ B60T 13/741
                                                         188/156
2016/0327104 A1\* 11/2016 Li ....................... F16D 65/0006
2016/0377137 A1\* 12/2016 Ohlig ................... B60T 13/741
                                                        188/106 F \* cited by examiner

ACTUATOR FOR ELECTRIC PARK BRAKE SYSTEM AND SELF-LOCKING MECHANISM THEREOF

CROSS REFERENCE TO RELATED APPLICATIONS

This non-provisional patent application claims priority under 35 U.S.C. § 119(a) from Patent Application No. 201510050697.8 filed in The People's Republic of China on Jan. 30, 2015, the entire contents of which are hereby incorporated by reference.

FIELD OF THE INVENTION

This invention relates to an electric parking brake system, and in particular to an actuator for the electrical parking brake system and its self-locking mechanism.

BACKGROUND OF THE INVENTION

A parking brake system of a car is mainly used to keep the car motionless when it is parked. The traditional parking brake system is hand-operated and thus named "handbrake". The driver needs to control the force of pulling the handbrake based on experience.

Electric parking brake (EPB) systems have been gradually replacing the traditional mechanical handbrakes. The existing EPB system includes a motor, an actuator connected with the shaft of the motor, and a brake mounted on a wheel of the car. The operation of the actuator is transmitted through a lead screw or a ball screw. To perform a brake operation, the driver needs only press an electric button to operate the motor which drives the actuator, which causes the lead screw or ball screw to rotate to apply the brake, thus braking the car. However, the lead screw transmission results in low transmission efficiency. While the ball screw can increase the transmission efficiency, the brake system cannot be self-locked so that brake may be released after the actuator is turned off allowing the car to roll away after the brake has been applied.

SUMMARY OF THE INVENTION

Hence, there is a desire for an actuator and a self-locking mechanism thereof which have high transmission efficiency and which can achieve the self-locking of the electric parking brake system.

Accordingly, in one aspect thereof, the present invention provides an actuator for an electric parking brake system, operable to apply or release the brake, the actuator comprising: a motor including a shaft; an output member; and a speed reduction device connected between the motor and the output member, the speed reduction device including: a transmission mechanism connected to the shaft, and; a self-locking mechanism connected with the transmission mechanism, the transmission mechanism including an output gear, the self-locking mechanism includes a fixed wheel, a movable wheel rotatable relative to the fixed wheel, and a spring disposed around the fixed wheel and the movable wheel, the movable wheel being connected between the output gear and the output member for transmitting the torque from the output gear to the output member, an inner diameter of the spring in its neutral state being less than or equal to an outer diameter of a part of the fixed wheel and movable wheel around which the spring is disposed, wherein the provision of the spring allows the torque to be transmitted from the motor to the output member, thereby operating the brake; and wherein when the output member rotates under an external force to generate a tendency to release the brake, the movable wheel rotates relative to the fixed wheel in a winding direction of the spring under the driving of the output member, the frictional force between the spring and the fixed wheel and movable wheel causes the spring to tighten and hold onto the fixed wheel to thereby prevent the movable wheel from rotating further.

Preferably, the output gear forms a plurality of driving blocks, the movable wheel forms a plurality of pushing blocks, each of the driving blocks extending in between two adjacent ones of the pushing blocks for driving the movable wheel to rotate with the output gear.

Preferably, the output gear forms at least one resisting block, the spring is disposed at a radially inner side of the resisting block, the spring has a front end, when the motor shaft rotates in a first direction to output a torque, the resisting block of the output gear pushes the front end of the spring to move in a direction opposite to a winding direction of the spring.

Preferably, the spring has a rear end, when the shaft rotates in a second direction, the pushing block of the movable wheel pushes the rear end of the spring to move in a direction opposite to the winding direction of the spring.

Preferably, the fixed wheel is fixed on a pivot axle, the output gear and the movable wheel are rotatably attached to the pivot axle and are disposed on opposite sides of the fixed wheel, respectively.

Preferably, the output gear comprises a pivot connecting portion connected with the pivot axle, an inner ring extending radially outwardly from the pivot connecting portion, an outer ring extending radially outwardly from the inner ring, and a meshing portion extending radially outwardly from the outer ring, an outer periphery of the meshing portion is formed with teeth, a resisting block protrudes inwardly from a radial inner surface of the outer ring or protrudes downwardly from a bottom surface of the inner ring, the resisting block and the pivot connecting portion are spaced apart in the radial direction, the driving block protrudes inwardly from a radial inner surface of the meshing portion or protrudes downwardly from a bottom surface of the outer ring.

Preferably, the inner ring is recessed with respect to the outer ring and the pivot connecting portion forming an annular receiving space between the outer ring and the pivot connecting portion, the spring and the fixed wheel being received in the receiving space and disposed between the resisting block and the pivot connecting portion.

Preferably, the fixed wheel has a recess in which the pivot connecting portion is received, and the fixed wheel and the output gear form a stepped assembly interface.

Preferably, the movable wheel includes a round-disc shaped body and a shaft seat extending from a center of the body toward the output gear, the shaft seat has an outer diameter substantially the same as an outer diameter of the fixed wheel, the shaft seat and the fixed wheel cooperatively form a cylindrical surface around which the spring is disposed.

Preferably, the fixed wheel forms a boss facing the movable wheel, the shaft seat of the movable wheel has a recess for receiving the boss, and the fixed wheel and the movable wheel form a stepped assembly interface.

Preferably, the output gear is in the form of a cylinder, the self-locking mechanism is received within the output gear, the movable wheel forms a pushing block, the output gear forms a through hole in which the pushing block is inserted, and the through hole is larger than the pushing block.

Preferably, an outer diameter of a top end of the fixed wheel is less than an outer diameter of a bottom end of the fixed wheel, the movable wheel is attached around the top end of the fixed wheel, and the spring surrounds the bottom end of the fixed wheel and the movable wheel.

Preferably, the output gear forms insertion slots, front and rear ends of the spring are inserted into the insertion slots, the insertion slots are larger than the front and rear ends in size, when the shaft rotates in a first direction the output gear pushes the front end of the spring to release the spring such that an inner diameter of the spring increases, when the shaft rotates in a second direction the output gear pushes the rear end of the spring to release the spring such that the inner diameter of the spring increases.

Preferably, the output gear includes a top plate and a sidewall extending from an outer edge of the top plate, the through hole is formed in the top plate, the movable wheel includes a body and a cylindrical portion extending from an outer edge of the body, the cylindrical portion is attached around the top end of the fixed wheel, the spring surrounds the cylindrical portion and the bottom end of the fixed wheel, the body and the top plate are stacked with each other, and the pushing block protrudes from an outer surface of the body.

Preferably, the insertions slots include one insertion slot formed in an edge of the top plate and another insertion slot formed in a bottom end of the sidewall, the front end of the spring extends axially into the insertion slot of the top plate, and the rear end of the spring extends radially into the insertion slot of the sidewall.

Preferably, the speed reduction device further includes a planetary gear mechanism connected between the movable wheel of the self-locking mechanism and the output member, the planetary gear mechanism includes at least one stage of planetary gear, each stage of planetary gear includes a sun gear, a planet carrier and multiple planet gears, the sun gear of a first stage of planetary gear of the planetary gear mechanism and the movable wheel are integrally formed, and the planet carrier of a last stage of planetary gear and the output member are integrally formed.

Preferably, an inner surface of the fixed wheel is formed with teeth which are meshed with the planet gears of the planetary gear mechanism.

Preferably, the speed reduction device further includes a housing receiving the transmission mechanism, self-locking mechanism and planetary gear mechanism, the housing forms a latch slot, an outer surface of the gear housing forms a latch block, and the latch block is latched in the latch slot of the housing to limit movement of the gear housing.

Preferably, the housing includes a bottom base, an upper cover and a lower cover connected between the upper cover and the bottom base, a first receiving space is formed between the lower cover and the upper cover for receiving the transmission mechanism, and a second receiving space is formed between the lower cover and the bottom base for receiving the planetary gear mechanism.

According to a second aspect, the present invention provides a self-locking mechanism, comprising: a fixed member; a first rotating body and a second rotating body rotatable relative to the fixed member, wherein the first rotating body and the second rotating body are drivingly connected; and a spring attached around the fixed member and the second rotating body, an inner diameter of the spring in its neutral state being less than or equal to an outer diameter of a part of the fixed member and second rotating body around which the spring is disposed, wherein the spring allows the first rotating body to drive the second rotating body and when the second rotating body rotates relative to the fixed member in a winding direction of the spring, a frictional force between the spring and the second rotating body and the fixed member causes the spring to be tightened and hold onto the fixed member to thereby prevent the second rotating body from rotating further.

Preferably, the first rotating body forms a plurality of driving blocks, the second rotating body forms a plurality of pushing blocks, each of the driving blocks extending in between two adjacent ones of the pushing blocks for driving the second rotating body to rotate along with the first rotating body.

Preferably, the first rotating body forms at least one resisting block, the spring is disposed at a radially inner side of the resisting block, the spring has a front end, when the first rotating body rotates in a first direction the resisting block of the first rotating body pushes the front end of the spring to move in a direction opposite to a winding direction of the spring.

Preferably, the spring has a rear end, when the first rotating body drives the second rotating body to rotate in a direction opposite to a winding direction of the spring, the pushing block of the second rotating body pushes the rear end of the spring to move in the direction opposite to the winding direction of the spring.

Preferably, the fixed member includes a fixed pivot axle and a fixed wheel fixed on the pivot axle, the first rotating body and the second rotating body are rotatably attached around the pivot axle and are disposed on opposite sides of the fixed wheel, respectively.

Preferably, the first rotating body comprises a pivot connecting portion connected with the pivot axle, an inner ring extending radially outwardly from the pivot connecting portion, an outer ring extending radially outwardly from the inner ring, and a meshing portion extending radially outwardly from the outer ring, an outer periphery of the meshing portion is formed with teeth, a resisting block protrudes inwardly from a radial inner surface of the outer ring or protrudes downwardly from a bottom surface of the inner ring, the resisting block and the pivot connecting portion are spaced apart in the radial direction, the driving block protrudes inwardly from a radial inner surface of the meshing portion or protrudes downwardly from a bottom surface of the outer ring.

Preferably, the inner ring is recessed with respect to the outer ring and the pivot connecting portion, an annular receiving space is formed between the outer ring and the pivot connecting portion, the spring and the fixed wheel are received in the receiving space and disposed between the resisting block and the pivot connecting portion.

Preferably, the fixed wheel forms a recess receiving the pivot connecting portion, and the fixed wheel and the first rotating body form a stepped assembly interface.

Preferably, the second rotating body includes a round-disc shaped body and a shaft seat extending from a center of the body toward the first rotating body, the shaft seat has an outer diameter substantially the same as an outer diameter of the fixed wheel, the shaft seat and the fixed wheel cooperatively form a cylindrical surface around which the spring is disposed, and the pushing block protrudes from an outer edge of the body toward the first rotating body.

Preferably, the fixed wheel forms a boss facing the second rotating body, the shaft seat of the second rotating body forms a recess receiving the boss, and the fixed wheel and the second rotating body form a stepped assembly interface.

Preferably, the first rotating body is in the form of a cylinder, the second rotating body, fixed member and spring are received within the first rotating body, the second rotating body forms a pushing block, the first rotating body forms a through hole in which the pushing block is inserted, and the through hole is larger than the pushing block.

Preferably, the first rotating body includes a top plate and a sidewall extending from an outer edge of the top plate, the through hole is formed in the top plate, the second rotating body includes a body and a cylindrical portion extending from an outer edge of the body, an outer diameter of a top end of the fixed member is less than an outer diameter of a bottom end of the fixed member, the body of the second rotating body and the top plate are stacked with each other, the cylindrical portion surrounds the top end of the fixed member, and the spring surrounds the bottom end of the fixed member and the cylindrical portion of the second rotating body.

Preferably, an insertion slot is formed in an edge of the top plate of the first rotating body, another insertion slot is formed in a bottom end of the sidewall, a front end of the spring extends axially into the insertion slot of the top plate, a rear end of the spring extends radially outward into the insertion slot of the sidewall, the insertion slots are greater than the front and rear ends of the spring in size, when the first rotating body rotates in a first direction the first rotating body pushes the front end of the spring to release the spring such that an inner diameter of the spring increases, when the first rotating body rotates in a second direction the first rotating body pushes the rear end of the spring to release the spring such that the inner diameter of the spring increases.

According to a third aspect, the present invention provides an actuator for an electric parking brake system for applying or releasing a brake, the actuator comprising a motor, an output member, and a speed reduction device connected between the motor and the output member, wherein the speed reduction device comprises the self-locking mechanism described above.

In the actuator described above, when the torque is transmitted from the motor through the speed reduction device to the output member, the output gear drives the movable wheel to rotate therewith through the driving blocks, the spring frictionally rotates relative to the fixed wheel along with the movable wheel. When the output member rotates under an external force to generate a trend of releasing the brake, the torque is transmitted from the output member to the movable wheel, the rotating movable wheel drives the spring to rotate in the winding direction of the spring, which causes the spring to decrease in its inner diameter and hold on the fixed wheel to thereby prevent the movable wheel from further rotation, which in turn prevents the output member from further rotation, thus achieving the self-locking function. The actuator of the present invention has an enhanced efficiency in comparison with the lead screw actuator.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 27 is an enlarged view of the encircled portion B of FIG. 25.

DETAILED DESCRIPTION OF THE PREFERRED EMBODIMENTS

Figure 1:
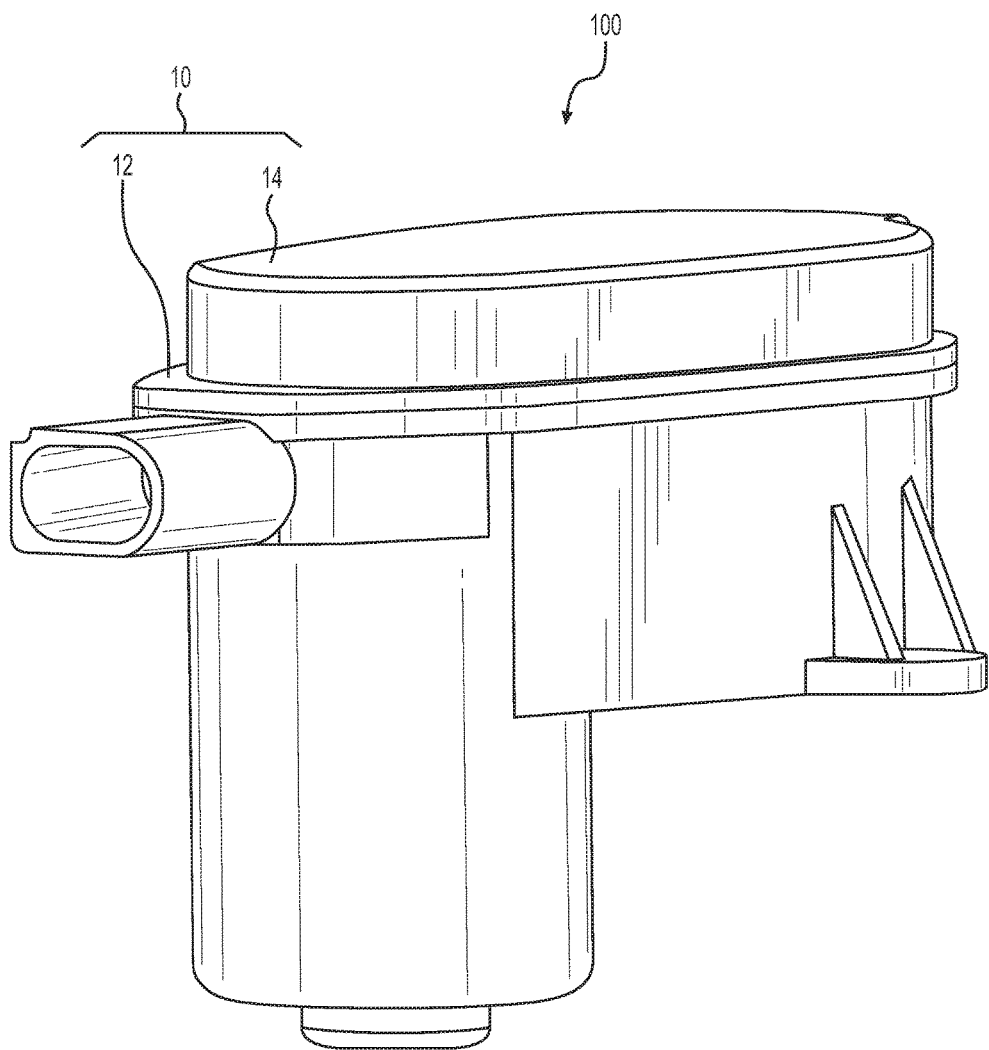
FIG. 1 is an assembled view of an actuator for an EPB system according to a first embodiment of the present invention.
Figure 2:
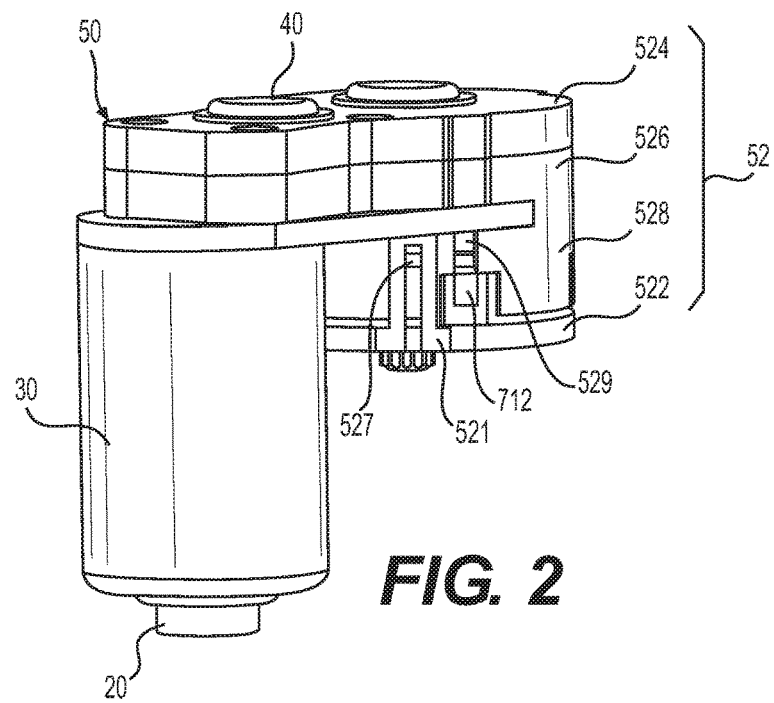
FIG. 2 illustrates the actuator of FIG. 1, with the outer housing removed.

Referring to FIG. 1 and FIG. 2, an actuator 100 for an electric parking brake (EPB) system in accordance with the present invention includes an outer housing 10, a motor 30 received in the outer housing 10, a speed reduction device 50 connected with the motor 30, and an output member 80 (see FIG. 5) connected with the speed reduction device 50.

Figure 3:
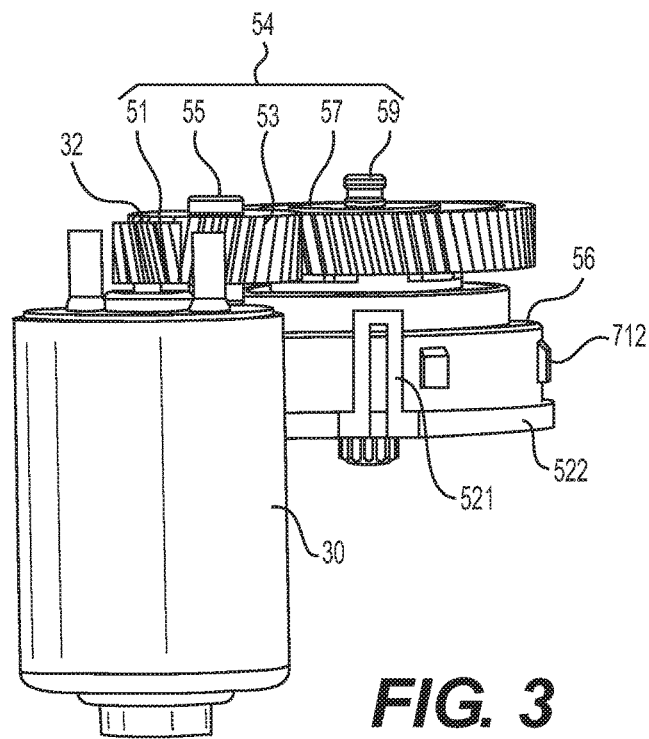
FIG. 3 illustrates the actuator of FIG. 2, with the housing of the speed reduction device removed.
Figure 4:
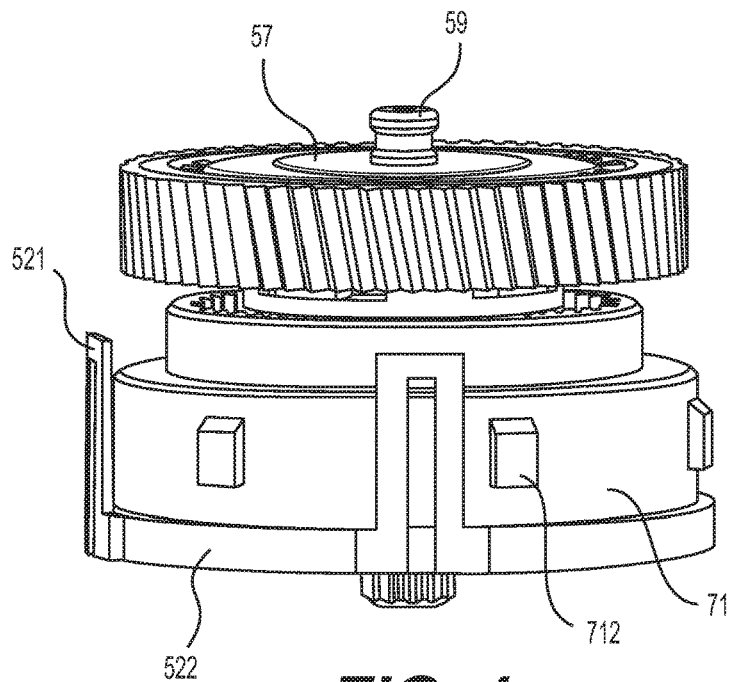
FIG. 4 is an assembled view of part of the speed reduction device of the actuator of FIG. 2.
Figure 5:
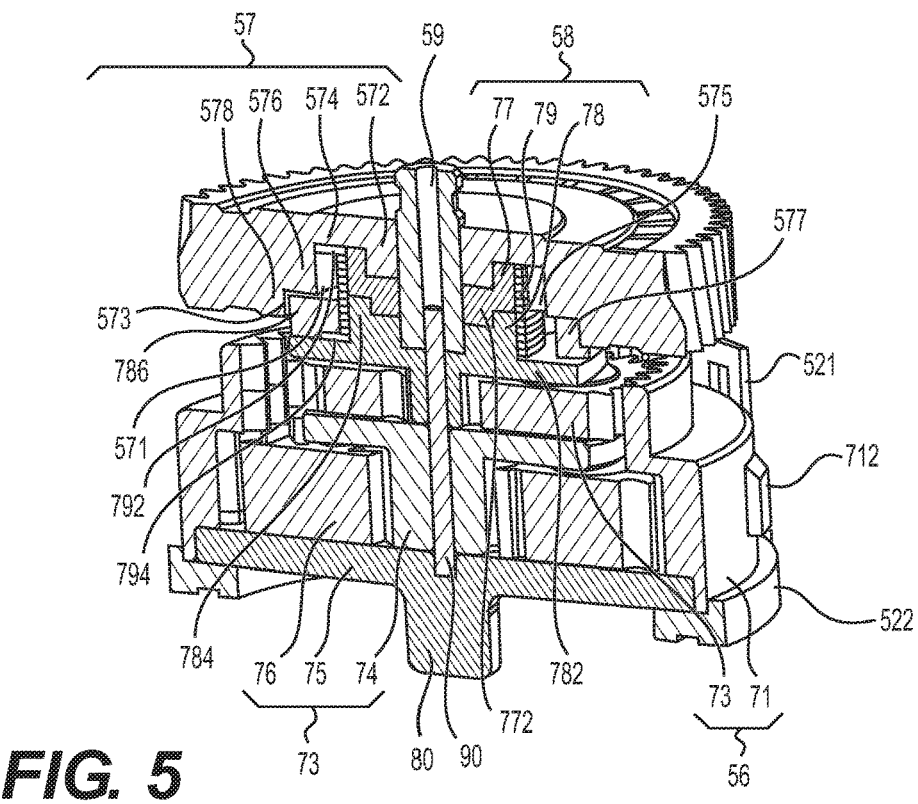
FIG. 5 is a sectional view of FIG. 4.
Figure 6:
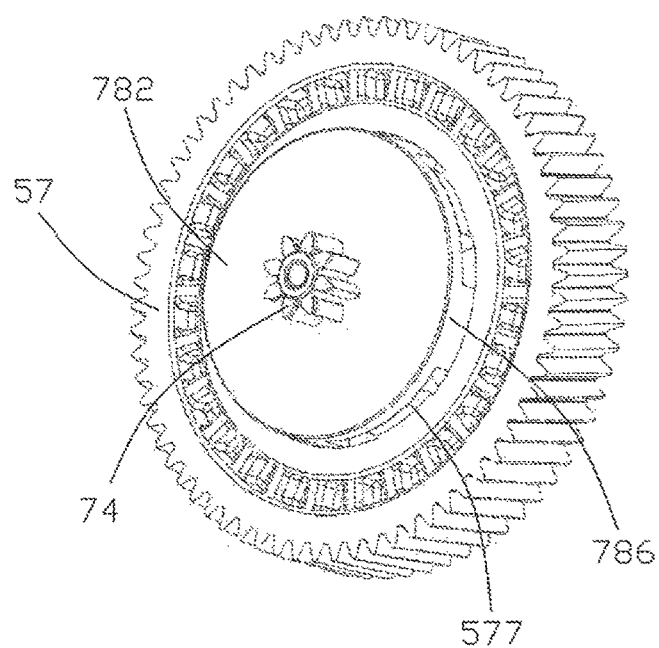
FIG. 6 is an assembled view of the output gear of the speed reduction device of FIG. 4 and the self-locking mechanism.

The outer housing 10 includes a house base 12 and a cover body 14 connected to a top side of the housing base 12. The cover body 14 and the housing base 12 cooperatively form a receiving space for receiving the motor 30 and the speed reduction device 50 therein. Referring also to FIG. 3 through FIG. 5, the speed reduction device 50 includes a housing 52, and a transmission mechanism 54, a planetary gear mechanism 56 and a self-locking mechanism 58 that are received in the housing 52. The self-locking mechanism 58 connects the transmission mechanism 54 and the planetary gear mechanism 56. The motor 30 and the planetary gear mechanism 56 are arranged side by side. The transmission mechanism 54 is located above and connected to the motor 30 and the planetary gear mechanism 56. Rotation of the motor 30 is transmitted through the transmission mechanism 54 and the self-locking mechanism 58 to the planetary gear mechanism 56 to drive the output member 80, which in turn drives the brake to brake the car thus preventing rolling of the car or, reversely, to release the brake thus allowing the car to move.

In order to avoid vibration of the motor 30 during operation to be transmitted to the outer housing 10, a buffer pad 20 made of a rubber material is disposed between a bottom of the motor 30 and the housing base 12. In addition, in order to reduce the vibration of the speed reduction device 50 during operation, an O-ring 40 is disposed between the speed reduction device 50 and the cover body 14 of the outer housing 10.

As shown in FIG. 2, the housing 52 of the speed reduction device 50 includes a bottom base 522, an upper cover 524, and a lower cover 526 connected between the upper cover 524 and the bottom base 522. The bottom base 522 is fixed in the outer housing 10 to support the planetary gear mechanism 56 and has a generally annular shape. The upper cover 524 is disposed to cover the transmission mechanism 54, which includes a top plate and a flange depending from an edge of the top plate. The lower cover 526 includes a bottom plate facing the top plate, a flange extending upward from an edge of the bottom plate, and a sidewall 528 extending downward from the bottom plate. The sidewall 528 has a generally cylindrical shape and matches with the bottom base 522 in shape and size. An opening is centrally defined in the part of the bottom plate that is surrounded by the sidewall 528. Upon assembly, the upper cover 524 and the lower cover 526 define a space there between for receiving the transmission mechanism 54, with the flange surrounding gears of the transmission mechanism 54. The sidewall 528 and the bottom base 522 cooperatively define a space for receiving the planetary gear mechanism 56.

Preferably, the upper cover 524, the bottom cover 526 and the bottom base 522 are joined by a snap fit connection. In this embodiment, a plurality of protrusions 527 is formed at a middle of an outer surface of the sidewall 528 of the lower cover 526, corresponding to the upper cover 524 and the bottom base 522. Locking pieces 521 extend upwardly from the bottom base 522. Each locking piece 521 has a locking hole which forms a snap connection with a corresponding one of the protrusions 527 on the sidewall 528. A plurality of locking arms extends downward from the upper cover 524. Each locking arm has a locking hole for snapping connection with a corresponding one of the protrusions 527, thus the upper cover 524, lower cover 526 and bottom base 522 are connected together to form the housing 52. It can be understood that the locking arms, and locking pieces 521 may be formed on the sidewall 528, and the protrusions 527 may be formed on the upper cover 524 and the bottom base 522. In this embodiment, the sidewall 528 further forms a latch slot 529 for engaging with the planetary gear mechanism 56 to limit relative movement there between.

The transmission mechanism 54 is connected to a shaft 32 of the motor 30. As shown in FIG. 3, in this embodiment, the transmission mechanism 54 is a gear transmission which includes multiple gears that are sequentially meshed, such as, an input gear 51, an intermediate gear 53, and an output gear 57. The input gear 51 is fixedly connected to a top end of the shaft 32 of the motor 30 for synchronous rotation with the shaft 32. The intermediate gear 53 is pivotably mounted between the top plate and bottom plate of the housing 52 through an axle 55 and rotates reversely under the driving of the input gear 51. The output gear 57 is connected to the housing 52 through a pivot axle 59. The pivot axle 59 has a top end fixedly connected to the top plate of the housing 52, and a bottom end passing through the opening of the bottom plate of the housing 52 to connect with the planetary gear mechanism 56. When the intermediate gear 53 rotates, the output gear 57 rotates reversely about the pivot axle 59. It should be understood that the intermediate gear 53 can be removed, or there may be two, three or more intermediate gears 53, depending upon the specific mounting space.

As shown in FIG. 5, the output gear 57 includes a pivot connecting portion 572 journalled on the pivot axle 59, a meshing portion 578 for meshing with the intermediate gear 53, and an inner ring 574 and an outer ring 576 formed between the pivot connecting portion 572 and the meshing portion 578.

The inner ring 574 extends outwardly from an outer edge of the pivot connecting portion 572. The outer ring 576 extends outwardly from an outer edge of the inner ring 574 to connect with the meshing portion 578. In an axial direction of the output gear 57, the inner ring 574 has a thickness that is less than the pivot connecting portion 572, the thickness of the outer ring 576 is greater than the pivot connecting portion 572 and the inner ring 574, and the thickness of the meshing portion 578 is greater than the outer ring 576. An outer surface of the meshing portion 578 is provided with teeth for meshing with the intermediate gear 53. Top surfaces of the pivot connecting portion 572, inner ring 574, outer ring 576 and meshing portion 578 are located at substantially the same height. A bottom surface of the inner ring 574 is higher than a bottom surface of the pivot connecting portion 572, a bottom surface of the outer ring 576 is lower than the bottom surfaces of the inner ring 574 and pivot connecting portion 572, and a bottom surface of the meshing portion 578 is lower than the bottom surface of the outer ring 576, such that an annular receiving space 571 is formed between the pivot connecting portion 572 and the outer ring 576, and an accommodating space 573 is formed below the outer ring 576 and within the meshing portion 578. The accommodating space 573 is in communication with the receiving space 571 to cooperatively form a stepped receiving chamber with a large top and a small bottom for receiving the self-locking mechanism 58.

Figure 7:
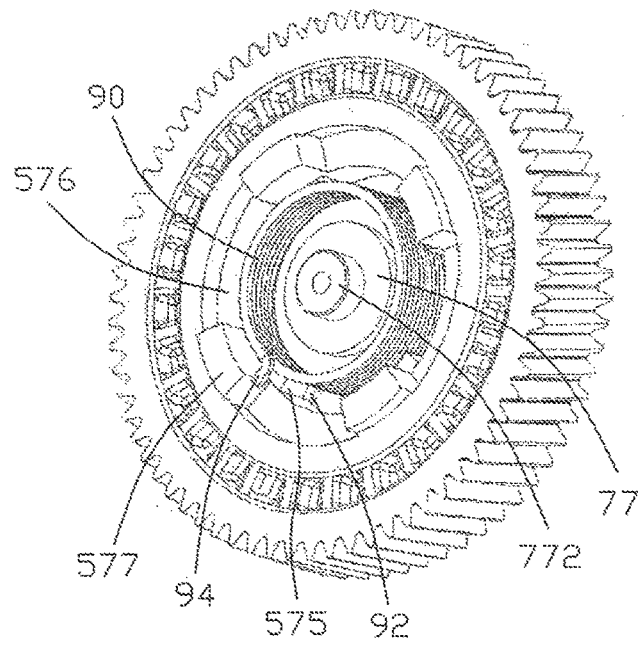
FIG. 7 illustrates the structure of FIG. 6, with the movable wheel removed.
Figure 9:
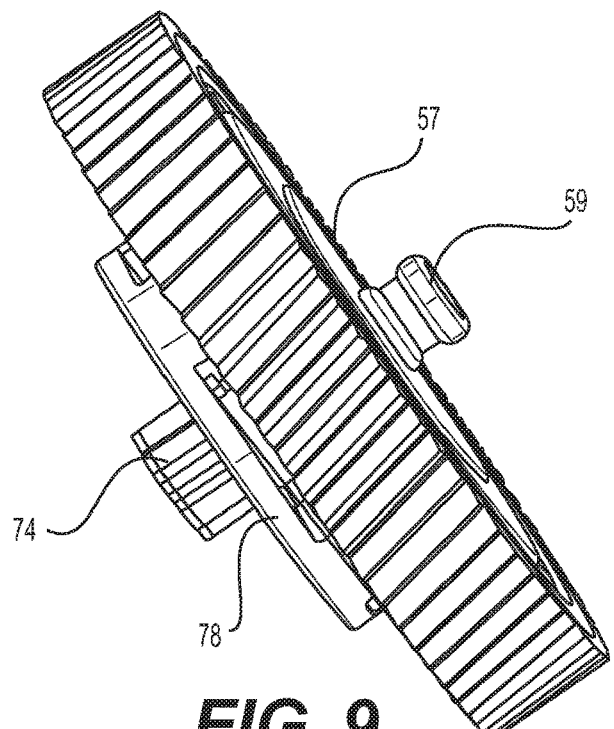
FIG. 9 illustrates the structure of FIG. 8, with the output gear removed.
Figure 8:
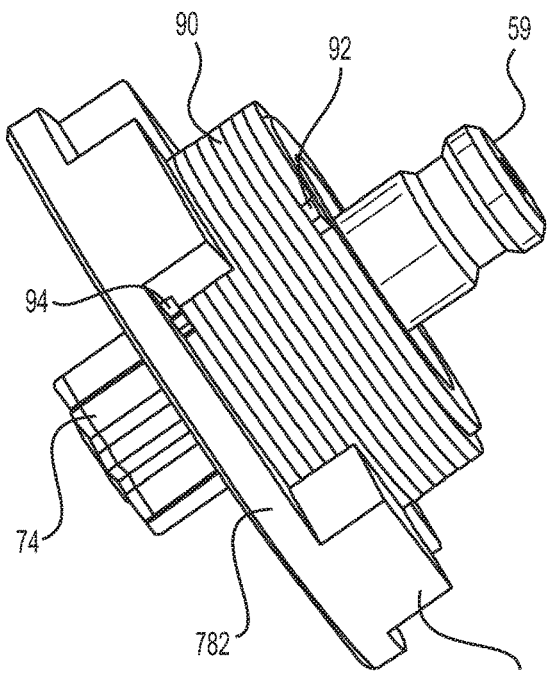
FIG. 8 is similar to FIG. 6, viewed from another aspect.

Referring also to FIG. 7, a plurality of resisting blocks 575 protrudes from a radially inner surface of the outer ring 576 into the receiving space 571. Preferably, the resisting blocks 575 are distributed in a circumferential direction of the output gear 57, and radially inner surfaces of the resisting blocks 575 are preferably arc-shaped. Preferably, in the axial direction of the output gear 57, the height of the resisting blocks 575 is not greater than the height of the receiving space 571, i.e. bottom surfaces of the resisting blocks 575 are not lower than the bottom surface of the outer ring 576. A width of the resisting blocks 575 is less than a width of the inner ring 574 in the radial direction. Therefore, the radially inner surfaces of the resisting blocks 575 are spaced a distance from the pivot connecting portion 572, i.e. a space cooperatively defined by the radially inner surfaces of the resisting blocks 575 has a diameter greater than an outer diameter of the pivot connecting portion 572. Top surfaces of the resisting blocks 575 are connected with the bottom surface of the inner ring 574. Therefore, the resisting blocks 575 can also be considered extending axially outward from the bottom surface of the inner ring 574. In an alternative embodiment, radially outer surfaces of the resisting blocks 575 may be spaced from the radially inner surface of the outer ring 576, or the top surfaces of the resisting blocks 575 may be spaced from the bottom surface of the inner ring 574.

A plurality of driving blocks 577 protrudes from a radially inner surface of the meshing portion 578 into the accommodating space 573. Preferably, inner surfaces of the driving blocks 577 are flush with the inner surface of the outer ring 576, i.e. the inner surfaces of the driving blocks 577 are preferably arc-shaped. The driving blocks 577 are evenly spaced in the circumferential direction of the output gear 57. In the axial direction of the output gear 57, the height of the driving blocks 577 is greater than the height of the accommodating space 573, i.e. distal ends of the driving blocks 577 extend beyond the output gear 57, and bottom surfaces of the driving blocks 577 are lower than the bottom surface of the meshing portion 578. Top surfaces of the driving blocks 577 are connected with the bottom surface of the outer ring 576. Therefore, the driving blocks 577 can be considered extending axially outwardly from the bottom surface of the outer ring 576. In an alternative embodiment, radially outer surfaces of the driving blocks 577 may be spaced from the radially inner surface of the meshing portion 578, or the top surfaces of the driving blocks 577 may be spaced from the bottom surface of the inner ring 574

Referring also to FIG. 5 through FIG. 9, the self-locking mechanism 58 includes a fixed wheel 77 fixed relative to the housing 52, a movable wheel 78 movable relative to the fixed wheel 77, and a spring 79 disposed around the fixed wheel 77 and movable wheel 78.

The fixed wheel 77 is fixedly attached to the pivot axle 59 below the output gear 57. An outer diameter of the fixed wheel 77 is greater than an outer diameter of the pivot connecting portion 572 of the output gear 57 but slightly less than an inner diameter of the resisting blocks 575. A top surface of the fixed wheel 77 is recessed downward to form a recess for receiving the pivot connecting portion 572 of the output gear 57, thus reducing an axial size of the speed reduction device 50. A central portion of a bottom surface of the fixed wheel 77 extends outward to form an annular boss 772.

The movable wheel 78 is rotatably connected to the pivot axle 59 below the fixed wheel 77. The movable wheel 78 includes a circular-disc-shaped body 782 and a shaft seat 784 extending from a central portion of a top surface of the body 782. An outer diameter of the body 782 is approximately the same as the outer diameter of the outer ring 576 of the output gear 57, and an outer diameter of the shaft seat 784 is approximately the same as the outer diameter of the fixed wheel 77. A central portion of a top surface of the shaft seat 784 is recessed to form a shaft hole for receiving a bottom end of the pivot axle 59. The shaft seat 784 further defines a recess surrounding the shaft hole, for receiving the boss 772 of the fixed wheel 77. As such, the assembly interface of the output gear 57 and the fixed wheel 77, and the assembly interface of the fixed wheel 77 and the movable wheel 78 are both step-shaped, which facilitates the assembly and positioning of the components and ensures the coaxiality of the assembled components and, at the same time, reduces the axial size of the assembled product.

A plurality of pushing blocks 786 extends upward from the top surface of the body 782 of the movable wheel 78. Radially inner surfaces of the pushing blocks 786 are preferably arc-shaped. The pushing blocks 786 are evenly spaced in the circumferential direction of the movable wheel 78. In this embodiment, the pushing blocks 786 are disposed close to an edge of the movable wheel 78, radially outer surfaces of the pushing blocks 786 are substantially flush with the radially outer surfaces of the body 782, and a space cooperatively defined by the radially inner surfaces of the pushing blocks 786 has a diameter that is approximately the same as the diameter of the space cooperatively defined by the radially inner surfaces of the resisting blocks 575.

Figure 10:
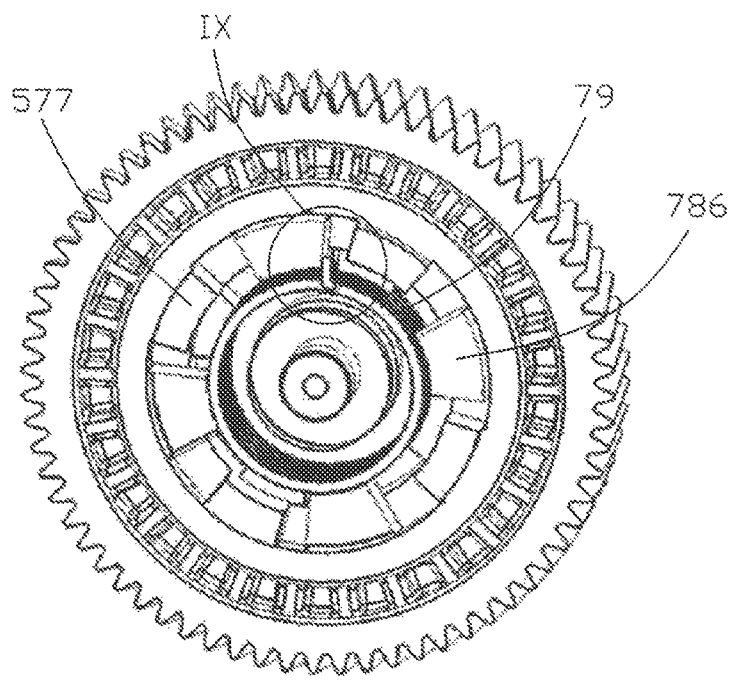
FIG. 10 is a plan view of FIG. 7.
Figure 11:
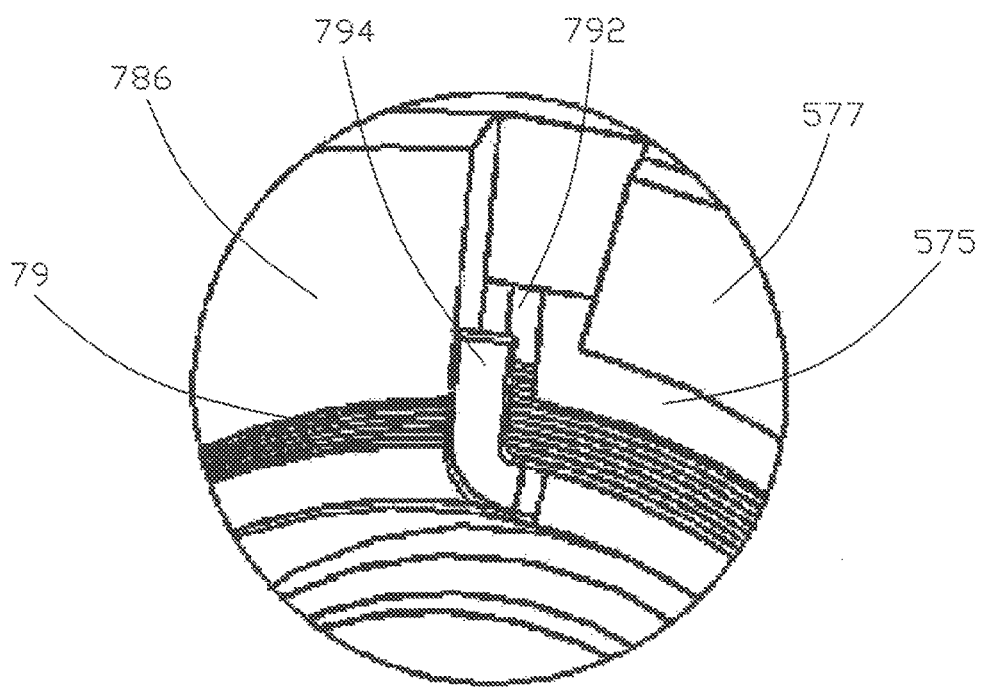
FIG. 11 is an enlarged view of encircled portion IX of FIG. 10.

Referring to FIG. 10 and FIG. 11, on assembly of the self-locking mechanism 58, the boss 772 of the fixed wheel 77 is inserted into the recess of the shaft seat 784 of the movable wheel 78. The outer surfaces of the fixed wheel 77 and the shaft seat 784 of the movable wheel 78 cooperatively form a cylindrical surface around which the spring 79 is wrapped. The spring 79 is helically wound from its front end 792 to its back end 794 in a clockwise direction. An inner diameter of the spring 79 in its neutral state is less than a diameter of the cylindrical surface and, therefore, when the spring 57 is disposed around the cylindrical surface, the spring 79 holds tightly to the outer surface of the fixed wheel 77 and the outer surface of the shaft seat 784 of the movable wheel 78. An outer diameter of the spring 79 is slightly less than the inner diameter of the resisting blocks 575 of the output gear 57 and the pushing blocks 786 of the movable wheel 78, and the front and back ends 792, 794 of the spring 79 extend transversely in a radially outward direction of the spring 79, with an extension length slightly less than the radial width of the resisting blocks 575.

In attaching the self-locking mechanism 58 onto the pivot axle 59, the bottom end of the pivot axle 59 is inserted into the shaft hole of the shaft seat 784 of the movable wheel 78 after passing through the fixed wheel 77, such that the movable wheel 78 is rotatably connected to the pivot axle 59. The part of the pivot connecting portion 572 of the output gear 57 protruding beyond the inner ring 574 is received in the recess of the fixed wheel. The fixed wheel 77 and the spring 79 are inserted into the receiving space 571 between the pivot connecting portion 572 and the outer ring 576 and abut against the bottom surface of the inner ring 574. The driving blocks 577 on the output gear 57 abut against the top surface of the body 782 of the movable wheel 78. The driving blocks 577 of the output gear 57 and the pushing blocks 786 of the movable wheel 78 are alternately arranged in the circumferential direction. At this time, an upper half of the spring 79 is located within the resisting blocks 575, with the front end 792 of the spring 79 inserted in between two adjacent resisting blocks 575. A lower half of the spring 79 is located within the pushing blocks 786 and driving blocks 577. The back end 794 is inserted in between two adjacent pushing blocks 786 and located within the radially inner side of and hence does not interference with the driving blocks 577.

When the output gear 57 rotates in a first direction, such as the clockwise direction, under the driving of the motor 30, the driving blocks 577 rotate to contact the pushing blocks 786 of the movable wheel 78. The rotating movable wheel 78 causes the pushing block 786 to contact the back end 794 of the spring 79, such that the spring 79 rotates with the movable wheel 78. The movable wheel 78 rotates in the clockwise direction under the driving of the output gear 57, such that the torque is transmitted from the output gear 57 to the movable wheel 78. As the movable wheel 78 rotates, the pushing block 786 pushes the back end 794 of the spring 79, such that the spring 79 expands outward to a certain extent. As a result, the inner diameter of the spring 79 is increased, which reduces the friction between the spring 79 and the fixed wheel 77, allowing the movable wheel to rotate.

In addition, in an alternative embodiment, the back end 794 of the spring 79 can be omitted. When the output gear 57 rotates clockwise, it can directly drive the movable wheel 78 to rotate clockwise. Due to the friction between the movable wheel 78 and the spring 79, the rotating movable wheel 78 brings the portion of the spring 79 attached around the movable wheel 78 to rotate clockwise. Because the rotating direction is opposite to the winding direction of the spring 79, the spring 79 expands outward to a certain extent. As a result, the inner diameter of the spring 79 is increased, and the spring 79 rotates relative to the movable wheel 78, such that the torque can be successfully transmitted from the output gear 57 to the movable wheel 78.

When the output gear 57 rotates in a second direction, such as the counter-clockwise, the resisting blocks 575 of the output gear 57 contact the front end 792 of the spring 79 to push the spring 79 to rotate with the output gear 57. The driving blocks 577 of the output gear 57 contact the pushing blocks 786 of the movable wheel 78 to rotate the movable wheel 78 along with the output gear 57, and the torque is thereby transmitted from the output gear 57 to the movable wheel 78. As the resisting blocks 575 of the output gear 57 push the front end 792 of the spring, the spring 79 is expanded outward to a certain extent. As a result, the inner diameter of the spring 79 is increased, which reduces the friction between the spring 79 and the fixed wheel 77 allowing the movable wheel to rotate.

That is, the transmission from the motor 30 to the self-locking mechanism 58 through the transmission mechanism 54 can drive the movable wheel 78 to smoothly rotate in the clockwise and counter-clockwise directions. In addition, the rotating movable wheel 78 causes the spring 79 to expand outward. As a result, the inner diameter of the spring 79 is increased, which reduces the friction between the spring 79 and the fixed wheel 77 and hence enhances the transmission efficiency.

Referring to FIG. 4 and FIG. 5, the planetary gear mechanism 56 includes a gear housing 71, with number of stages of planetary gears 73 received in the gear housing 71. Two stages of planetary gears are illustrated in this embodiment. In an alternative embodiment, the planetary gear mechanism 56 may have a single stage, three or more stages. More stages bring better speed reduction results.

The gear housing 71 is supported on the bottom base 522 of the housing 20. A plurality of latch blocks 712 protrudes from an outer surface of the gear housing 71. The latch blocks 712 are latched in the latch slots 529 of the sidewall 528 to position the gear housing 71 in the circumferential direction so that the gear housing 71 cannot rotate. Each stage of planetary gear 73 includes a sun gear 74, a planet carrier 75, and multiple planet gears 76. Each planet gear 76 is rotatably connected to the planet carrier 75 through an axle. The sun gear 74 is located between the planet gears 76 and meshed with each of the planet gears 76. The planet gears 76 also mesh with a corresponding stationary ring gear inside the gear housing 71. A ring gear is formed in an inner surface of the gear housing 71, which corresponds to each stage of planetary gear 73 and is meshed with all planet gears of that corresponding stage.

The multiple stages of planetary gear 73 are connected in series. The sun gear 74 of each stage of planetary gear 73 is integrally connected to and rotates with the planet carrier 75 of a previous stage of planetary gear 73. The sun gear 74 of the first stage of planetary gear 73 is integrally connected to and rotates with the movable gear 78 of the self-locking mechanism 58, and the planet carrier 75 of the last stage of planetary gear 73 is integrally connected to the output member 80. The output member 80 serves as the output part of the entire speed reduction device 50, which may be a gear structure that connects to the brake after passing through the bottom base 522 of the speed reduction device 50 and the outer housing 10. Preferably, a center shaft passes through the sun gears 74 and planet carriers 75 of all stages of planetary gear 73 to connect the multiple stages of planetary gear 73 in series. The center shaft 90 has a bottom end inserted into the planet carrier 75 of the last stage of planetary gear 73, and a top end fixedly connected into the pivot axle 59 after passing through the movable wheel 78. This effectively ensures the coaxiality between the various stages of planetary gear 73 of the planetary gear mechanism 56 and the coaxiality between the planetary gear mechanism 56 and the movable wheel 78 and output gear 57.

Figure 12:
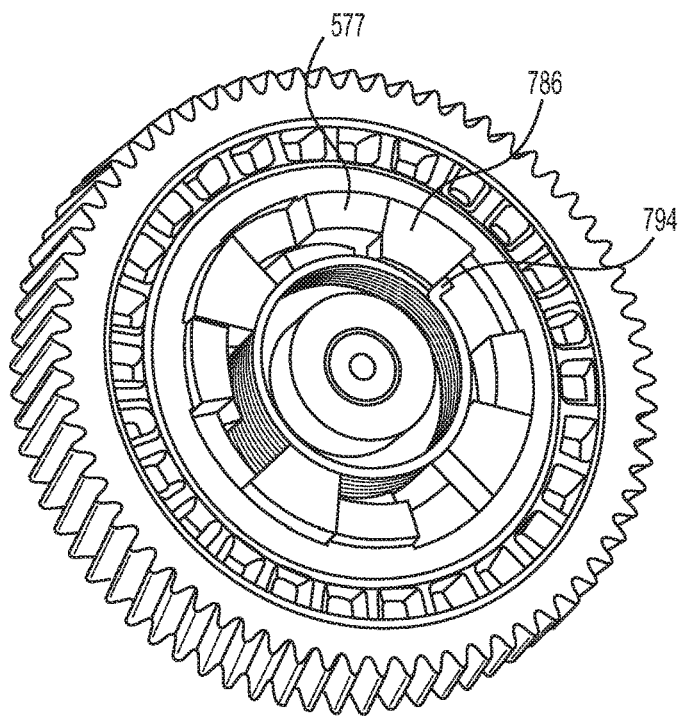
FIG. 12 illustrates the positional relationship between various parts when the output gear rotates clockwise.
Figure 13:
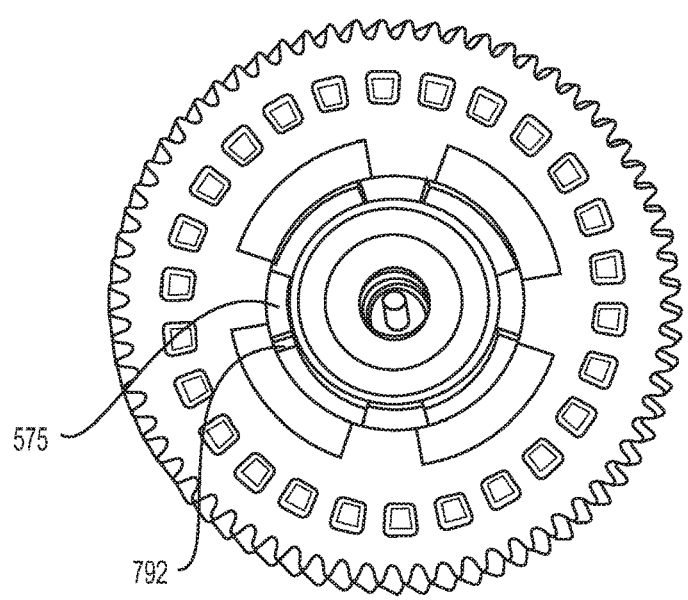
FIG. 13 illustrates the positional relationship between the output gear and the spring when the output gear rotates counter-clockwise.
Figure 14:
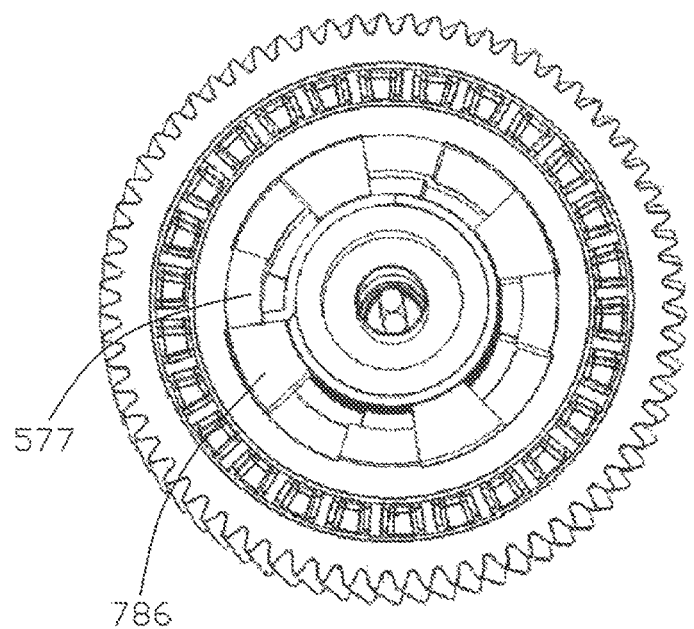
FIG. 14 illustrates the positional relationship between the output gear and the movable wheel when the movable wheel rotates counter-clockwise.

When there is a need to operate the brake to brake the car, as shown in FIG. 12, rotation of the motor shaft 32 is transmitted to the output gear 57 through the transmission mechanism 54, the output gear 57 is rotated clockwise, the torque is transmitted to the movable wheel 78, which in turn drives the planetary gear mechanism 56 to drive the output member 80 to rotate clockwise, thus driving the brake to brake and prevent rolling of the car. When there is a need to release the brake, the motor 30 is powered to rotate in the reverse direction, i.e. counter-clockwise, as shown in FIG. 13 and FIG. 14. The torque of the shaft 32 is transmitted to the output gear 57 through the transmission mechanism 54, the output gear 57 is rotated counter-clockwise, the torque is transmitted to the movable wheel 78, which is further transmitted to the planetary gear mechanism 56 through the movable wheel 78, which in turn drives the output member 80 to rotate counter-clockwise, thereby releasing the brake.

After the brakes have been applied, if the output member 80 rotates counter-clockwise under an external force, there is a tendency to release the brake. The output member 80 drives the movable wheel 78 to rotate counter-clockwise through the entire planetary gear mechanism 56. Because of the friction between the movable wheel 78 and the spring 79, the counter-clockwise rotation of the movable wheel 78 causes the part of the spring 79 attached around the movable wheel 78 to rotate counter-clockwise therewith. Because the rotational direction of the spring 79 is the same as its winding direction, the counter-clockwise rotation of the spring 79 reduces the inner diameter of the spring 79. This makes the spring 79 hold the fixed wheel 77 more tightly, such that a sufficiently large friction force is generated between the spring 79 and the fixed wheel 77, which makes the spring 79 unable to rotate relative to the fixed wheel 77. Therefore, the movable wheel 78 is prevented from rotating relative to the fixed wheel 77, and the output gear 57 is prevented from rotating further. The stopping of the movable wheel counteracts on the output member 80, such that the output member 80 cannot rotate further to release the brake. As such, the transmission of the brake of the present EPB system cannot be operated reversely and, therefore, after the car is braked, the brake is self-locked which prevents the car from rolling.

Figure 15:
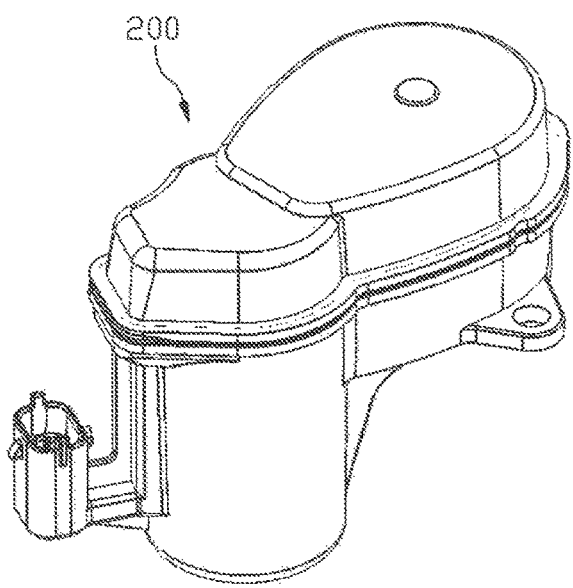
FIG. 15 illustrates an actuator according to another embodiment of the present invention.
Figure 16:
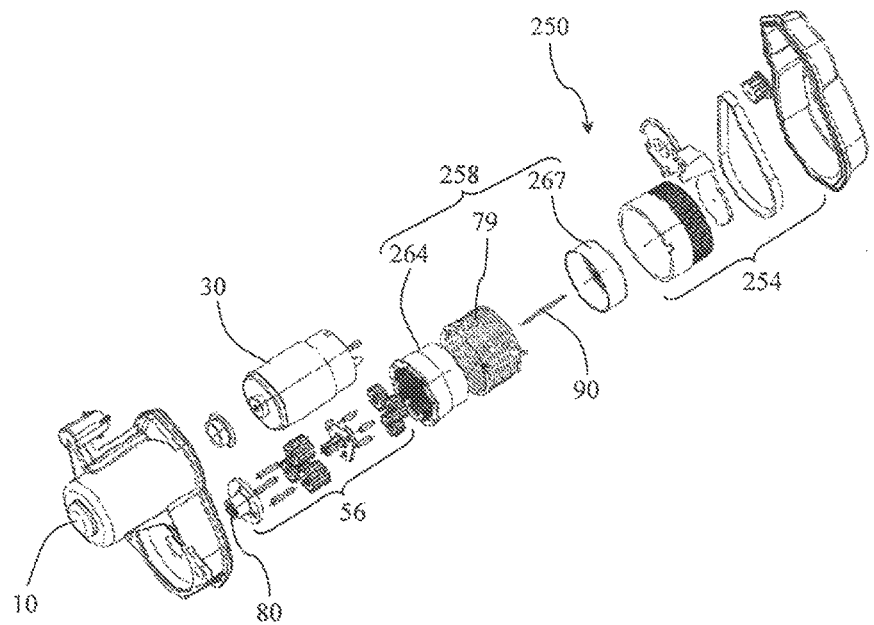
FIG. 16 is an exploded view of FIG. 15.

FIG. 15 and FIG. 16 illustrate an actuator 200 according to another embodiment of the present invention. The differences mainly lie in the transmission mechanism 254 and the self-locking mechanism 258 of the speed reduction device 250.

Figure 17:
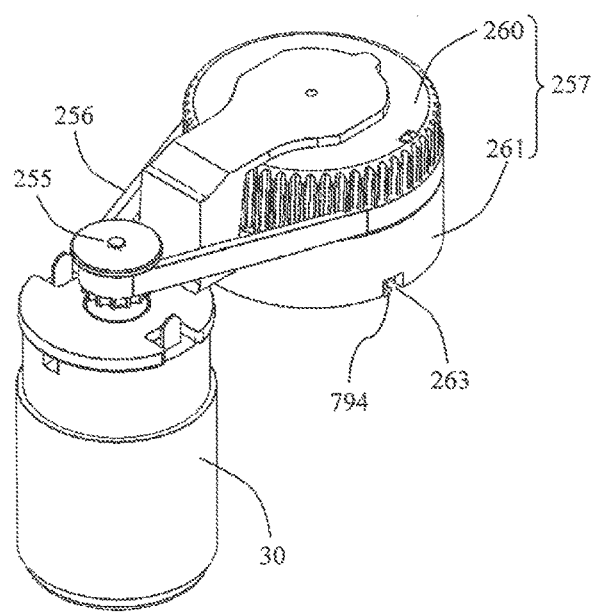
FIG. 17 is a view of the actuator of FIG. 15, with the outer housing removed.
Figure 18:
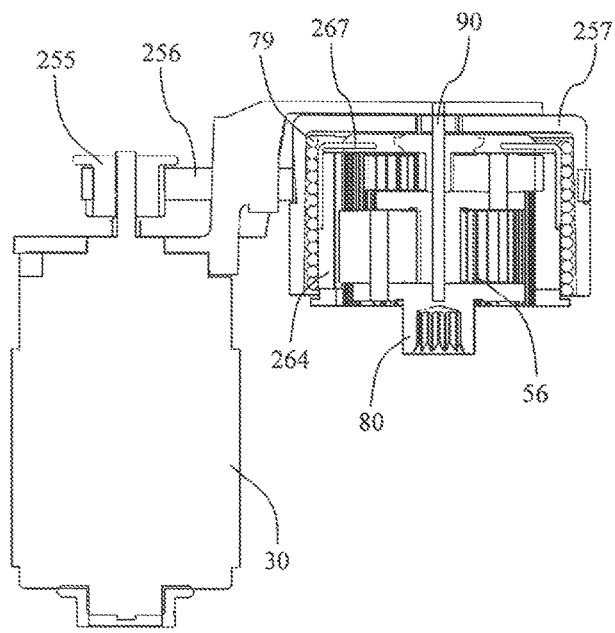
FIG. 18 is a sectional view of FIG. 17.
Figure 19:
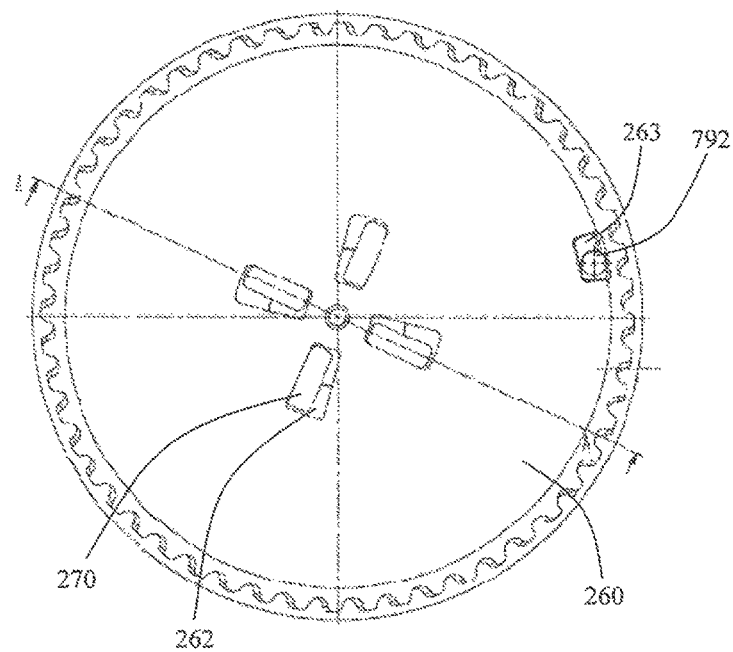
FIG. 19 is an assembled view of the output gear of the actuator of FIG. 15 and the self-locking mechanism.

Referring also to FIG. 17 through FIG. 19, in this embodiment, the transmission mechanism 254 adopts a belt transmission. An input gear 255 and an output gear 257 are connected through a belt 256. The output gear 257 has a size much greater than the size of the input gear 255, such that the output speed of the output gear 257 is much less than the rotational speed of the motor 30. The output gear 257 is a hollow cylinder with an opening at one end thereof, including a round top plate 260 and a sidewall 261 extending axially from an edge of the top plate 260. The belt 256 is attached around the sidewall 261. A center hole is formed in a center of the top plate 260. The top end of the center shaft 90 passes through the planetary gear mechanism 56 and then passes through the center hole of the top plate 260. Through holes 262 are defined in the top plate 260, which surround the center hole and engage with a movable wheel 267 of the self-locking mechanism 258. In this embodiment, there are multiple through holes 262 which are evenly distributed in a circumferential direction. In an alternative embodiment, there may also be a single through hole 262. An insertion slot 263 is formed in an edge of the top plate 260, which axially passes through the top plate 260. Another insertion slot 263 is formed in a bottom end of the sidewall 261, which radially passes through the sidewall 261. The two insertion slots 263 are used to receive the front end 792 and back end 794 of the spring 79, respectively. The size of the insertion slot 263 is greater than the size of the front end 792/back end 794, such that the front end 792 and back end 794 are movable in their respective insertion slots 263. In an alternative embodiment, the two insertion slots 263 may be both formed in the sidewall 261.

Figure 20:
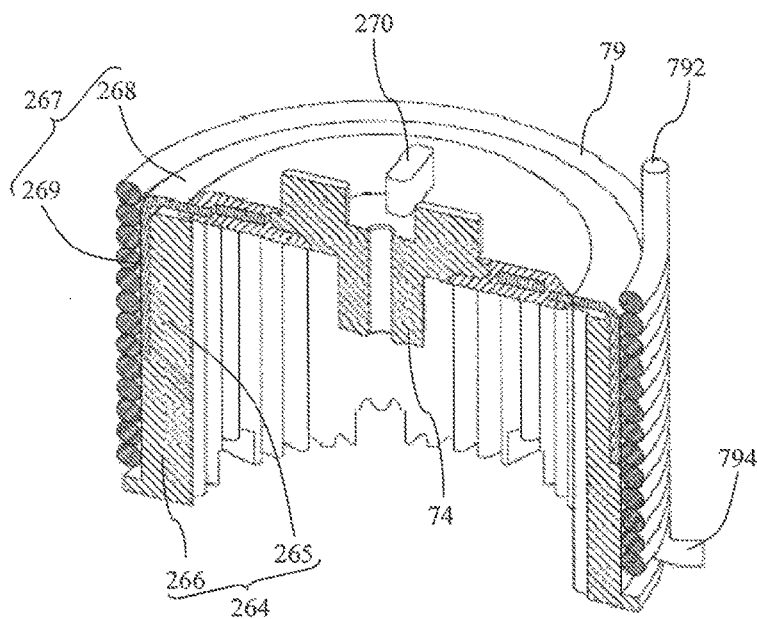
FIG. 20 is a sectional view of the self-locking mechanism of the actuator of FIG. 15.
Figure 21:
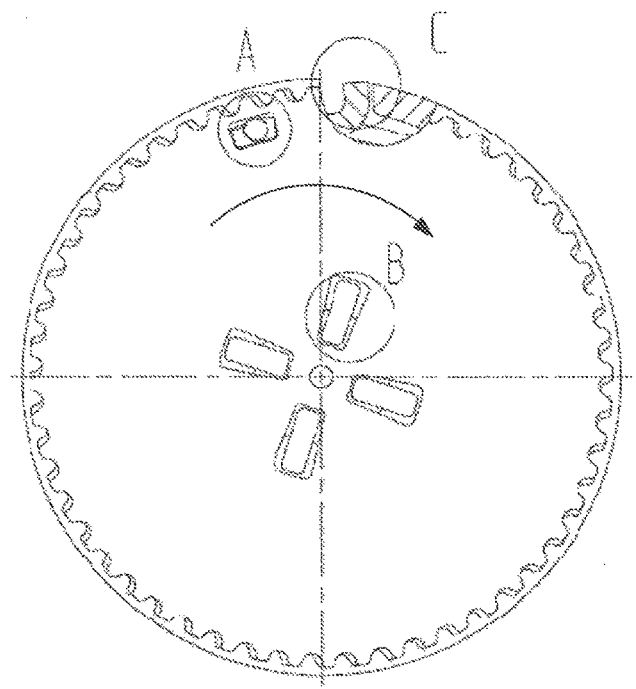
FIG. 21 illustrates the positional relationship between the output gear and the self-locking mechanism of the actuator when the brake is applied.
Figure 22:
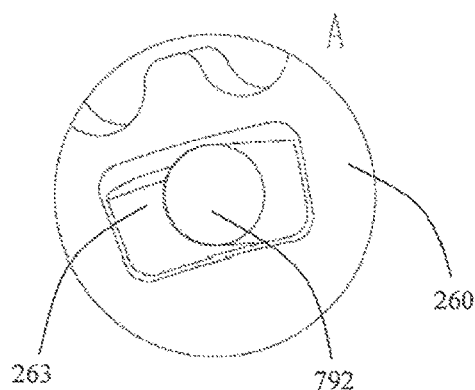
FIG. 22 is an enlarged view of the encircled portion A of FIG. 21.
Figure 23:
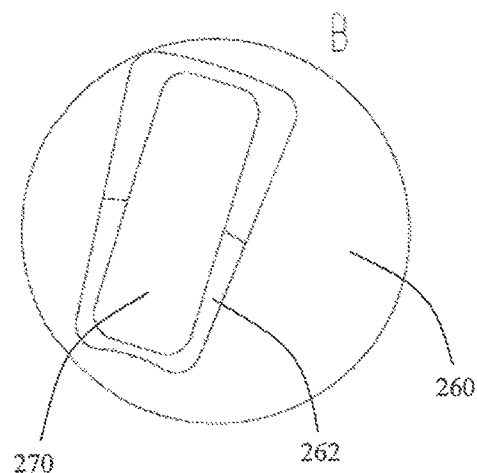
FIG. 23 is an enlarged view of the encircled portion B of FIG. 21.
Figure 24:
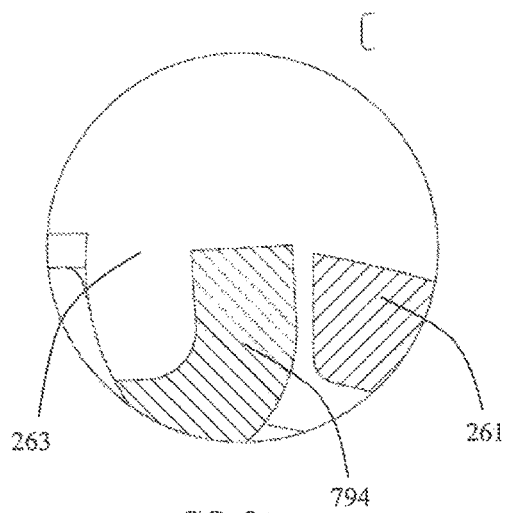
FIG. 24 is an enlarged view of the encircled portion C of FIG. 21.
Figure 25:
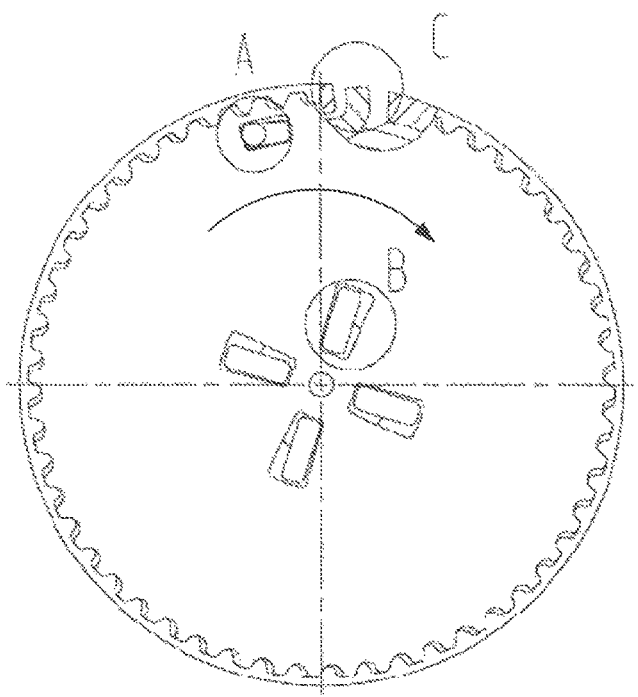
FIG. 25 illustrates the positional relationship of the parts when the output gear rotates clockwise to drive the spring of the self-locking mechanism to release the brake.

Referring also to FIG. 20, in this embodiment, the self-locking mechanism 258 includes a fixed wheel 264, the movable wheel 267, and the spring 79. The fixed wheel 264 is fixed in the outer housing 10 and is a cylinder with opposite open ends. The fixed wheel 264 forms teeth on its inner surface for engaging with various stages of planetary gear 73 of the planetary gear mechanism 56, and acts as the gear housing 71 of the planetary gear mechanism 56. In other words, in this embodiment, the fixed wheel 264 and the gear housing 71 are integrally formed. A top end 265 of the fixed wheel 264 has an outer diameter less than the outer diameter of its bottom end 266, such that the fixed wheel 264 has a stepped outer surface.

The movable wheel 267 is a hollow cylinder with an opening at one end, including a round body 268 and a cylindrical portion 269 extending downward from an edge of the body 268. The cylindrical portion 269 is attached around the top end 265 of the fixed wheel 264. An axial height of the cylindrical portion 269 is approximately the same as the height of the top end 265 of the fixed wheel 264. An inner diameter of the cylindrical portion 269 may be equal to or slightly greater than the outer diameter of the top end 265 of the fixed wheel 264. An outer diameter of the movable wheel 267 is approximately the same as the outer diameter of the bottom end 266 of the fixed wheel 264, such that when the movable wheel 267 is attached around the top end 265 of the fixed wheel 264, the outer surface of the bottom end 266 of the fixed wheel 264 and an outer surface of the cylindrical portion 269 of the movable wheel 267 cooperatively form a cylindrical surface. The spring 79 is attached around this cylindrical surface. The inner diameter of the spring 79 in its neutral state is less than a diameter of the cylindrical surface, such that the spring 79 holds the outer surface of the bottom end 266 of the fixed wheel 264 and the outer surface of the cylindrical portion 269 of the movable wheel 267. The front end 792 of the spring 79 extends axially outward to insert into the insertion slot 263 of the top plate 260 of the output gear 257, and the back end 794 extends radially outward to insert into the insertion slot 263 of the sidewall 261 of the output gear 257.

A through hole is formed in a center of the body 268 of the movable wheel 267, for allowing the center shaft 90 to pass there through. A top surface of the body 268 is formed with pushing blocks 270 corresponding to the through holes 262 of the output gear 257. There are the same number of pushing blocks 270 and through holes 262, but the pushing blocks 270 are smaller in size than the through holes 262. On assembly, the movable wheel 267 is received in the output gear 257, the pushing blocks 270 on the movable wheel 267 are inserted into and are movable in the respective through holes 262 of the output gear 257, such that the output gear 257 can rotate a certain angle relative to the movable wheel 267. A bottom surface of the body 268 of the movable wheel 267 is integrally connected with the sun gear 74 of the first stage of planetary gear 73 of the planetary gear mechanism 56, such that when the output gear 257 rotates to drive the movable wheel 267, the planetary gear mechanism 56 is driven to rotate, which in turn drives the output member 80.

Figure 26:
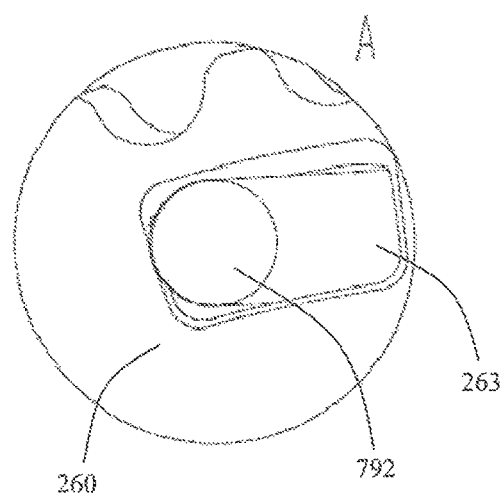
FIG. 26 is an enlarged view of the encircled portion A of FIG. 25.
Figure 28:
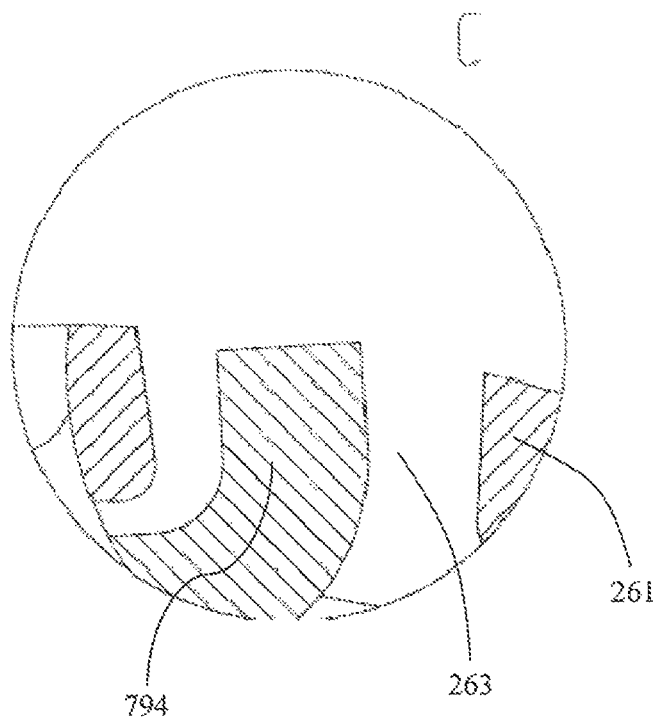
FIG. 28 is an enlarged view of the encircled portion C of FIG. 25.
Figure 29:
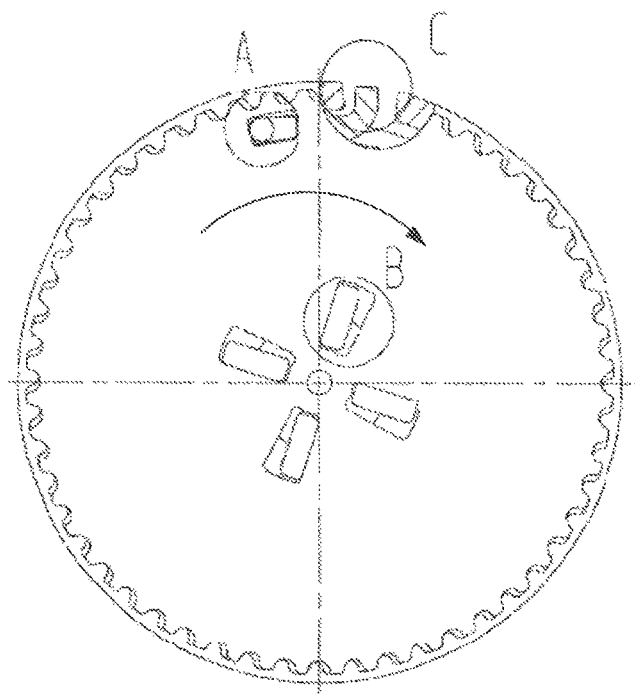
FIG. 29 illustrates the positional relationship of the parts when the output gear rotates clockwise to drive the movable wheel of the self-locking mechanism.
Figure 30:
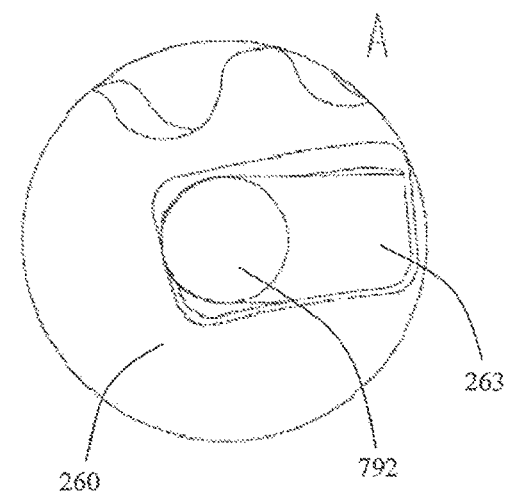
FIG. 30 is an enlarged view of the encircled portion A of FIG. 29.
Figure 31:
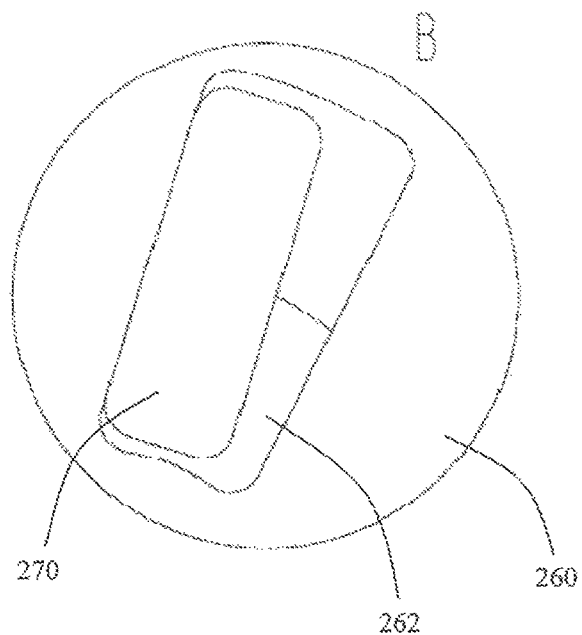
FIG. 31 is an enlarged view of the encircled portion B of FIG. 29.
Figure 32:
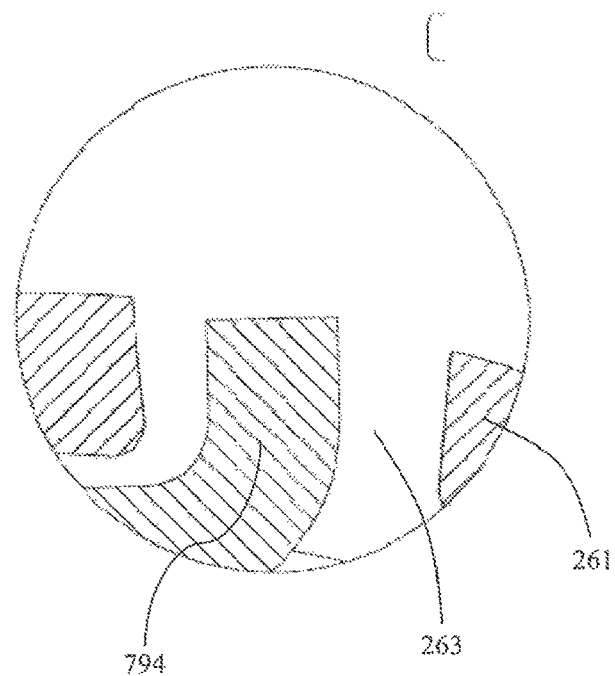
FIG. 32 is an enlarged view of the encircled portion C of FIG. 29.
Figure 33:
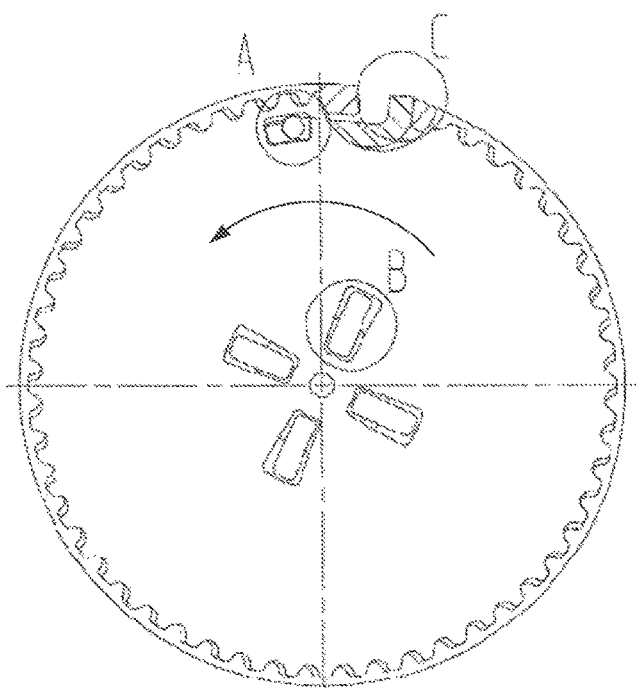
FIG. 33 illustrates the positional relationship of the parts when the output gear rotates counter-clockwise to drive the spring to release the brake.

As shown in FIG. 21 to FIG. 24, in an initial state, the pushing blocks 270 of the movable wheel 267 are located at centers of the through holes 262 of the output gear 257, and two sides of each through hole 262 of the output gear 257 in the circumferential direction do not contact one corresponding pushing block 270 (FIG. 23); the front end 792 of the spring 79 is located at a center of the insertion slot 263 of the top plate 260, and two sides of the insertion slot 263 in the circumferential direction do not contact the front end 792 of the spring 79 (FIG. 22); the back end 794 of the spring 79 is close to a right edge of the insertion slot 263 of the sidewall 261 of the output gear 257. When initiating the braking operation, the output gear 257 rotates clockwise under the driving of the motor 30. As shown in FIG. 25 through FIG. 28, when the output gear 257 rotates, a left edge of the insertion slot 263 of the top plate 260 first contacts the front end 792 of the spring 79 (FIG. 26). At this time, the back end 794 of the spring 79 is located at a center of the insertion slot 263 of the sidewall 261 (FIG. 28), a left edge of each through hole 262 is close to but still spaced a distance from the corresponding pushing block 270. At this time, the output gear 257 drives the front end 792 of the spring 79 to rotate with the output gear 257, which releases the spring 79. This makes the spring 79 expand outward to a certain extent and increases the inner diameter of the spring 79, thus reducing the friction between the spring 79 and the fixed wheel 264.

With the further rotation of the output gear 257, as shown in FIG. 29 through FIG. 32, the left edge of each through hole 262 of the output gear 257 contacts the corresponding pushing block 270 of the movable wheel 267 (FIG. 31), thus driving the movable wheel 267. At this time, the output gear 257 keeps abutting against the front end 792 of the spring 79 (FIG. 30), the back end 794 is located at the center of the corresponding insertion slot 263 (FIG. 32), and the spring 79 is always in the expanded state. The movable wheel 267 rotates smoothly and has a small friction force during rotation. The output member is rotated clockwise through the planetary gear mechanism 56, which in turn drives the brake for braking operation.

After braking the car, if the output member rotates reversely under an external force and drives the movable wheel 267 to rotate counter-clockwise through the planetary gear mechanism 56, it will create a tendency to release the brake. Because the pushing block 270 of the movable wheel 267 contacts the left edge of the through hole 262 of the output gear 257, the output gear 257 is driven to rotate counter-clockwise a small angle, the rotation of the output gear 257 makes the left edge of the insertion slot 263 of the top plate 260 separate from the front end 792 of the spring 79. Although the sidewall 261 of the output gear 257 is close to the back end 794 of the spring 79, it is still spaced a distance from the back end 794. At this time, the output gear 257 cannot drive the spring 79 so as to release the spring 79, the friction between the movable wheel 267 and the spring 79 makes the spring 79 more tight. With the rotation of the movable wheel 267, the frictional force of the movable wheel 267 gradually increases until the movable wheel 267 stops rotating, which counteracts on the output member, making the output member unable to rotate further to release the brake. Therefore, after the car is braked, the brake is self-locked which prevents the car from rolling.

Figure 34:
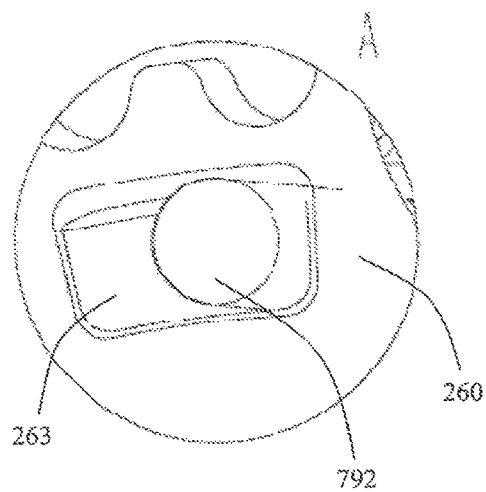
FIG. 34 is an enlarged view of the encircled portion A of FIG. 33.
Figure 35:
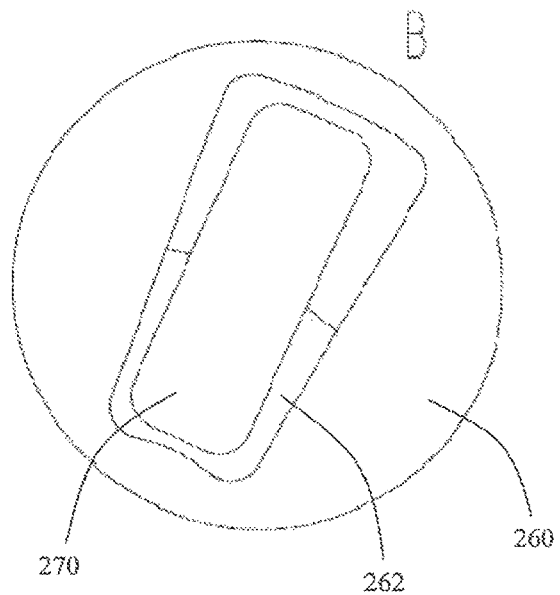
FIG. 35 is an enlarged view of the encircled portion B of FIG. 33.
Figure 36:
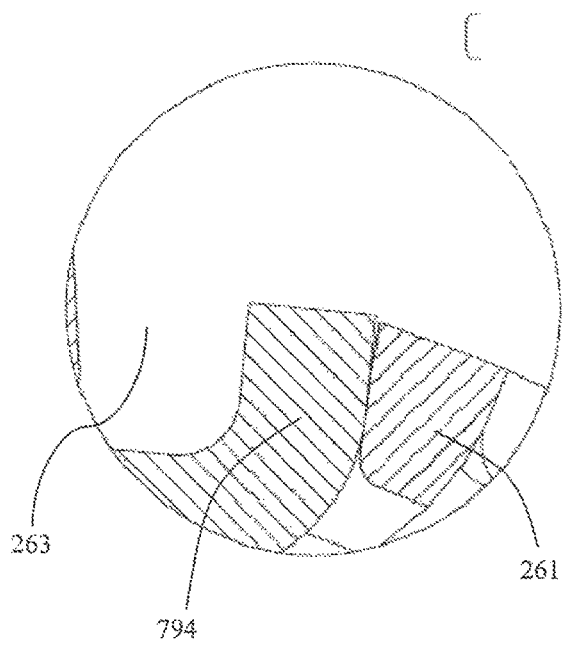
FIG. 36 is an enlarged view of the encircled portion C of FIG. 33.
Figure 37:
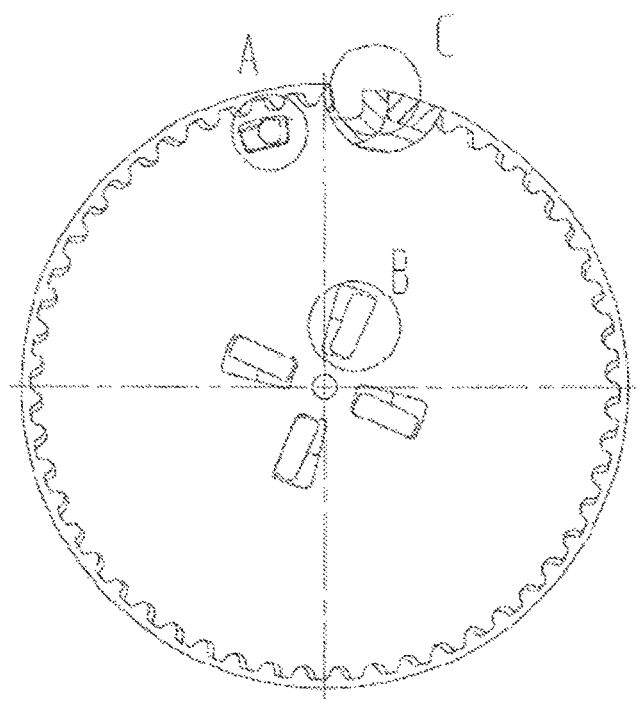
FIG. 37 illustrates the output gear rotating counter-clockwise to drive the movable wheel to a released position.
Figure 38:
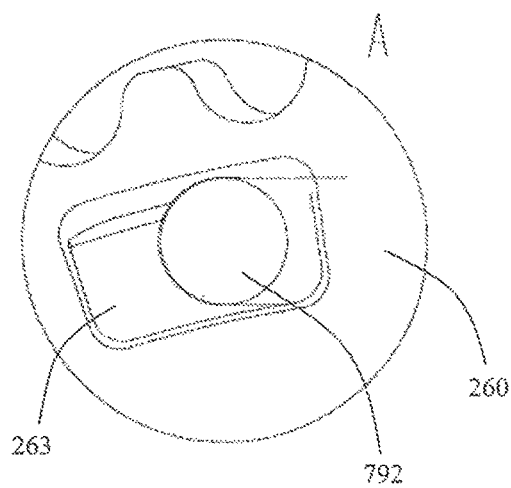
FIG. 38 is an enlarged view of the encircled portion A of FIG. 37.
Figure 39:
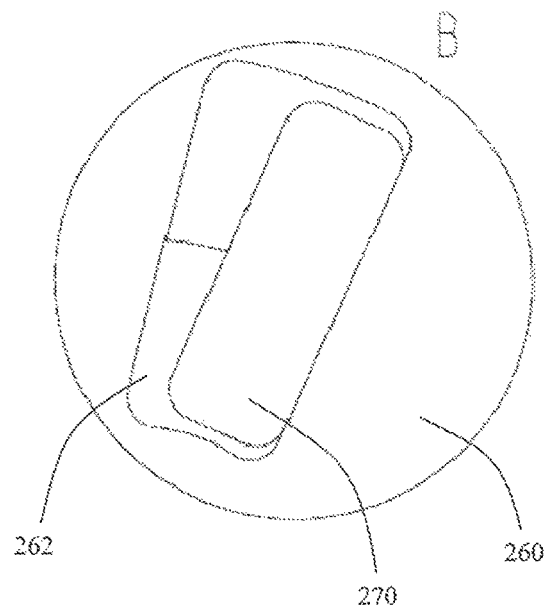
FIG. 39 is an enlarged view of the encircled portion B of FIG. 37.
Figure 40:
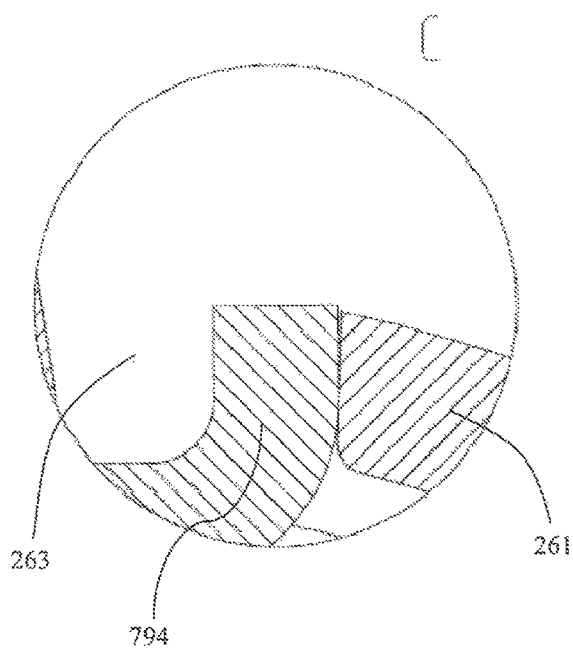
FIG. 40 is an enlarged view of the encircled portion C of FIG. 37.

When there is a need to re-start the car after it is braked, as shown in FIG. 33 to FIG. 36, the motor 30 drives the output gear 257 to rotate reversely in the counter-clockwise direction, the left edge of the insertion slot 263 of the sidewall 261 of the output gear 257 first contacts the back end 794 of the spring 79 (FIG. 40) to drives the back end 794 of the spring 79 to rotate clockwise therewith. This releases the spring 79 and increases the inner diameter of the spring 79, thus reducing the frictional force between the spring 79 and the fixed wheel 264. At this time, as shown in FIG. 34 and FIG. 35, as the output gear 257 rotates, the front end 792 of the spring 79 and the pushing blocks 270 of the movable wheel 267 return to the centers of the insertion slot 263 and the through holes 262. With the output gear 257 rotating further, the left edges of the through holes 262 of the output gear 257 contact the pushing blocks 270 of the movable wheel 267 to drive the movable wheel 267, which in turn drives the output member to reversely rotate in the counter-clockwise direction through the planetary gear mechanism 56. The brake is thus driven to be released such that the car can be moved.

As can be seen from the above, by means of the tightening and releasing of the spring 79 of the self-locking mechanism 58 (258), the actuator 100 (200) of the EPB system of the present invention allows the torque to be transmitted from the motor 30 to the brake through the transmission mechanism 54 (254), self-locking mechanism 58 (258) and planetary gear mechanism 56 and prevents reverse transmission, thereby achieving self-locking of the brake after the car is braked and hence prevents rolling of the car. During applying and releasing the brake, the spring 79 is caused to expand outward a certain extent, which reduces the friction and hence enhance the overall transmission efficiency. In addition, the actuator 100 of the present invention achieves the self-locking by means of the friction between the movable wheel 78 and the spring 79, which ensures the safety and stability of the actuator 100.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An actuator for an electric parking brake system, operable to apply or release the brake, the actuator comprising:
   a motor including a shaft;
   an output member; and
   a speed reduction device connected between the motor and the output member, the speed reduction device including:
   a transmission mechanism connected to the shaft; and
   a self-locking mechanism connected with the transmission mechanism, the transmission mechanism including an output gear, the self-locking mechanism includes a fixed wheel, a movable wheel rotatable relative to the fixed wheel, and a spring sleeved on a part of the fixed wheel and a part of the movable wheel, the movable wheel being connected between the output gear and the output member for transmitting the torque from the output gear to the output member, an inner diameter of the spring in its neutral state being less than or equal to an outer diameter of the part of the fixed wheel and the part of the movable wheel on which the spring is sleeved, wherein the provision of the spring allows the torque to be transmitted from the motor to the output member, thereby operating the brake, and wherein when the output member rotates under an external force to generate a tendency to release the brake, the movable wheel rotates relative to the fixed wheel in a winding direction of the spring under the driving of the output member, the frictional force between the spring and the fixed wheel and movable wheel causes the spring to tighten and hold onto the fixed wheel to thereby prevent the movable wheel from rotating further.

2. The actuator of claim 1, wherein the output gear forms a plurality of driving blocks, the movable wheel forms a plurality of pushing blocks, each of the driving blocks extending in between two adjacent ones of the pushing blocks for driving the movable wheel to rotate with the output gear.

3. The actuator of claim 2, wherein the output gear forms at least one resisting block, the spring is disposed at a radially inner side of the resisting block, the spring has a front end, when the motor shaft rotates in a first direction to output a torque, the resisting block of the output gear pushes the front end of the spring to move in a direction opposite to a winding direction of the spring.

4. The actuator of claim 3, wherein the spring has a rear end, when the shaft rotates in a second direction, one of the pushing blocks of the movable wheel pushes the rear end of the spring to move in a direction opposite to the winding direction of the spring.

5. The actuator of claim 2, further including a pivot axle, wherein the fixed wheel is fixed on the pivot axle, the output gear and the movable wheel are rotatably attached to the pivot axle and are disposed on opposite sides of the fixed wheel, respectively.

6. The actuator of claim 5, wherein the output gear comprises a pivot connecting portion connected with the pivot axle, an inner ring extending radially outwardly from the pivot connecting portion, an outer ring extending radially outwardly from the inner ring, and a meshing portion extending radially outwardly from the outer ring, an outer periphery of the meshing portion is formed with teeth, a resisting block protrudes inwardly from a radial inner surface of the outer ring or protrudes downwardly from a bottom surface of the inner ring, the resisting block and the pivot connecting portion are spaced apart in the radial direction, each of the driving blocks protrudes inwardly from a radial inner surface of the meshing portion or protrudes downwardly from a bottom surface of the outer ring.

7. The actuator of claim 6, wherein the inner ring is recessed with respect to the outer ring and the pivot connecting portion forming an annular receiving space between the outer ring and the pivot connecting portion, the spring and the fixed wheel being received in the receiving space and disposed between the resisting block and the pivot connecting portion.

8. The actuator of claim 6, wherein the fixed wheel has a recess in which the pivot connecting portion is received, and the fixed wheel and the output gear form a stepped assembly interface.

9. The actuator of claim 1, wherein the movable wheel includes a round-disc shaped body and a shaft seat extending from a center of the body toward the output gear, the shaft seat has an outer diameter substantially the same as an outer diameter of the fixed wheel, the shaft seat and the fixed wheel cooperatively form a cylindrical surface around which the spring is disposed.

10. The actuator of claim 9, wherein the fixed wheel forms a boss facing the movable wheel, the shaft seat of the movable wheel has a recess for receiving the boss, and the fixed wheel and the movable wheel form a stepped assembly interface.

11. The actuator of claim 1, wherein the output gear is in the form of a cylinder, the self-locking mechanism is received within the output gear, the movable wheel forms a pushing block, the output gear forms a through hole in which the pushing block is inserted, and the through hole is larger than the pushing block.

12. The actuator of claim 11, wherein an outer diameter of a top end of the fixed wheel is less than an outer diameter of a bottom end of the fixed wheel, the movable wheel is attached around the top end of the fixed wheel, and the spring surrounds the bottom end of the fixed wheel and the movable wheel.

13. The actuator of claim 12, wherein the output gear font's insertion slots, front and rear ends of the spring are inserted into the insertion slots, the insertion slots are larger than the front and rear ends in size, when the shaft rotates in a first direction the output gear pushes the front end of the spring to release the spring such that an inner diameter of the spring increases, when the shaft rotates in a second direction the output gear pushes the rear end of the spring to release the spring such that the inner diameter of the spring increases.

14. The actuator of claim 13, wherein the output gear includes a top plate and a sidewall extending from an outer edge of the top plate, the through hole is formed in the top plate, the movable wheel includes a body and a cylindrical portion extending from an outer edge of the body, the cylindrical portion is attached around the top end of the fixed wheel, the spring surrounds the cylindrical portion and the bottom end of the fixed wheel, the body and the top plate are stacked with each other, and the pushing block protrudes from an outer surface of the body.

15. The actuator of claim 14, wherein the insertions slots include one insertion slot formed in an edge of the top plate and another insertion slot formed in a bottom end of the sidewall, the front end of the spring extends axially into the insertion slot of the top plate, and the rear end of the spring extends radially into the insertion slot of the sidewall.

16. The actuator of claim 1, wherein the speed reduction device further includes a planetary gear mechanism connected between the movable wheel of the self-locking mechanism and the output member, the planetary gear mechanism includes at least one stage of planetary gear, each stage of planetary gear includes a sun gear, a planet carrier and multiple planet gears, the sun gear of a first stage of planetary gear of the planetary gear mechanism and the movable wheel are integrally formed, and the planet carrier of a last stage of planetary gear and the output member are integrally formed.

17. The actuator of claim 16, wherein an inner surface of the fixed wheel is formed with teeth which are meshed with the planet gears of the planetary gear mechanism.

18. The actuator of claim 16, wherein the speed reduction device further includes a housing receiving the transmission mechanism, self-locking mechanism and planetary gear mechanism, the housing forms a latch slot, the planetary gear mechanism further comprises a gear housing receiving the at least one stage of planetary gear, an outer surface of the gear housing forms a latch block, and the latch block is latched in the latch slot of the housing to limit movement of the gear housing.

19. The actuator of claim 18, wherein the housing includes a bottom base, an upper cover and a lower cover connected between the upper cover and the bottom base, a first receiving space is formed between the lower cover and the upper cover for receiving the transmission mechanism, and a second receiving space is formed between the lower cover and the bottom base for receiving the planetary gear mechanism.

* * * * *